United States Patent
Barrus et al.

(10) Patent No.: US 10,338,783 B2
(45) Date of Patent: Jul. 2, 2019

(54) TAB SWEEPING AND GROUPING

(71) Applicant: Microsoft Technology Licensing, Redmond, WA (US)

(72) Inventors: Adam E. Barrus, Bellevue, WA (US); Paula J. Chuchro, Seattle, WA (US); Laura J. McDermott, Sammamish, WA (US); Rose E. Zeller, Redmond, WA (US); Mark Yalovsky, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 632 days.

(21) Appl. No.: 14/543,742

(22) Filed: Nov. 17, 2014

(65) Prior Publication Data

US 2016/0139750 A1 May 19, 2016

(51) Int. Cl.
G06F 3/0483 (2013.01)
G06F 3/0482 (2013.01)
G06F 3/0484 (2013.01)
G06F 3/0481 (2013.01)

(52) U.S. Cl.
CPC .......... G06F 3/0483 (2013.01); G06F 3/0481 (2013.01); G06F 3/0482 (2013.01); G06F 3/04842 (2013.01)

(58) Field of Classification Search
CPC ... G06F 3/0483; G06F 3/0482; G06F 3/04842
See application file for complete search history.

(56) References Cited

U.S. PATENT DOCUMENTS

| 8,332,381 B1* | 12/2012 | Coudron | G06F 3/048 707/706 |
| 8,631,340 B2 | 1/2014 | Schreiner et al. | |
| 8,881,032 B1* | 11/2014 | Weber | G06F 3/0483 715/733 |
| 2003/0197735 A1* | 10/2003 | Woltzen | G06F 17/3089 715/777 |
| 2007/0162864 A1* | 7/2007 | Masselle | G06F 3/0483 715/765 |
| 2008/0040682 A1* | 2/2008 | Sorenson | G06F 3/04817 715/777 |

(Continued)

OTHER PUBLICATIONS

"Second Written Opinion Issued in PCT Application No. PCT/US2015/060236", dated Sep. 12, 2016, 5 Pages.

(Continued)

*Primary Examiner* — Anil K Bhargava

(57) ABSTRACT

Multiple tabs are displayed in a tab row, with each tab corresponding to a respective display of content. In response to receiving a single action user input, two or more of the multiple tabs are grouped together into a tab group that is displayed in the tab row instead of the two or more tabs. These two or more tabs may be grouped together according to a wide range of options that may be designated by a user. Tab groups enable simultaneous interaction with individual tabs of the tab group, such as sharing, saving, and viewing content associated with the individual tabs. Ungrouped tabs and tab groups displayed in the tab row can further be sorted for display according to one or more user preferences to enhance the overall experience in interacting with different displays of content.

20 Claims, 19 Drawing Sheets

(56) References Cited

U.S. PATENT DOCUMENTS

| | | | | |
|---|---|---|---|---|
| 2008/0177994 A1* | 7/2008 | Mayer | ................... | G06F 9/4418 713/2 |
| 2008/0301562 A1* | 12/2008 | Berger | ................ | G06F 17/3089 715/733 |
| 2009/0327947 A1* | 12/2009 | Schreiner | .............. | G06F 3/0483 715/777 |
| 2011/0271217 A1* | 11/2011 | Cruz Moreno | ....... | G06F 3/0482 715/765 |
| 2012/0131485 A1* | 5/2012 | Svendsen | .............. | G06F 3/0483 715/769 |

OTHER PUBLICATIONS

"International Preliminary Report on Patentability Issued in PCT Application No. PCT/US2015/060236", dated Jan. 25, 2017, 6 Pages.

"Tab Group Switcher—A Missing Switch Button for Tab Groups!", Retrieved From: <http://firefox.exxile.net/tgs/> Sep. 2, 2014, Aug. 26, 2013, 4 pages.

CHAR101, "TabGroups Menu", Retrieved From: <https://addons.mozilla.org/en-us/firefox/addon/tabgroups-menu/> Sep. 2, 2014, Oct. 13, 2013, 2 pages.

Elliott, "Convert Chrome Tabs to a List to Save Memory and Your Sanity", Retrieved From: <http://www.cnet.com/how-to/convert-chrome-tabs-to-a-list-to-save-memory-and-your-sanity/> Sep. 3, 2013, Mar. 13, 2013, 4 pages.

Ghazi, "Firefox Tweak Guide", Retrieved From: <http://www.tweakguides.com/Firefox_6.html> Sep. 3, 2014, Sep. 2014, 11 pages.

Hoang, "Opera: How to Stack or Group Tabs", Retrieved From: <http://www.tech-recipes.com/rx/9738/opera-how-to-stackgroup-similar-tabs/> Sep. 3, 2014, Nov. 2010, 3 pages.

Mundhra, "How to Instantly Hide or Restore Chrome Browser Tabs With PanicButton (Plus a Hidden Stealth Mode Trick)", Retrieved From: <http://www.guidingtech.com/9329/panicbutton-instantly-hide-restore-chrome-tabs-stealth-mode-trick/> Sep. 3, 2014, 9 pages.

Travesser, "Tab Groups Helper", Retrieved From: <https://addons.mozilla.org/en-US/firefox/addon/tab-groups-helper/> Sep. 2, 2014, Jul. 8, 2014, 3 pages.

Woods, "Opera 11 Beta Arrives With Stacked Tabs", Retrieved From: <http://www.zdnet.com/opera-11-beta-arrives-with-stacked-tabs-3040090960/> Sep. 3, 2014, Nov. 23, 2010, 4 pages.

"International Search Report & Written Opinion Received for PCT Application No. PCT/US2015/060236", dated Jan. 19, 2016, 10 Pages.

* cited by examiner

1300

1302
Display One Or More Tabs And/or Tab Groups In A Tab Row

1304
Receive Input Corresponding To One Or More Tabs And/or Tab Groups In The Tab Row

1306
Change The Display In Response To The Received Input.

1602
Present One Or More Options For Sorting Tabs Displayed In A Tab Row

1604
Receive Input Corresponding To A Selection Of One Of The One Or More Options

1606
Sort Tabs Displayed In The Tab Row According To The Selected Option

Fig. 16

TAB SWEEPING AND GROUPING

BACKGROUND

As computing technology has advanced, today's users are able to access, create, and share an ever-increasing amount of electronic content through their computing devices. Electronic content is now accessible from resource locations around the world via web browsers, applications, and a wide range of other mediums. Wanting instant access to this content, users frequently keep many disparate content displays open simultaneously on a single device. The availability of all these displays, however, is not without its problems. One such problem is an increased difficulty in managing the organization of these displays, resulting in user frustration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, multiple tabs are displayed in a tab row, and a single action user input is received. In response to receiving this single action user input, the multiple tabs of the tab row are grouped together into a tab group that represents the multiple tabs. This tab group is displayed in the tab row instead of the multiple tabs.

In accordance with one or more aspects, one or more tab groups and one or more tabs are displayed in a tab row. A user input corresponding to one of the one or more tab groups is received. A selection of one or more selectable tab group options is received, and the selected tab group option is performed.

In accordance with one or more aspects, multiple tabs are displayed in a tab row, and a single action user input is received at the tab row. In response to receiving the single action user input, the multiple tabs are sorted, and the sorted multiple tabs are displayed in the tab row.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 13 is a flowchart illustrating an example process for changing a display based on inputs to a tab row in accordance with one or more embodiments.

FIG. 16 is a flowchart illustrating an example process for sorting multiple tabs in a tab row in accordance with one or more embodiments.

DETAILED DESCRIPTION

Tab management techniques are discussed herein. In order to organize and keep separate different displays for corresponding content, windowed display environments commonly support separate windows for displaying content from a resource location. Although the introduction of a tabbed display greatly enhanced the convenience of interfacing with different instances of content in a single window, tab management remains a tedious and unintuitive process. In order to manage these tabs, multiple ungrouped tabs are displayed in a tab row. In response to receiving a single action user input at the tab row, multiple ones of the ungrouped tabs are grouped together into a tab group. This tab group is then displayed instead of the tabs that were grouped together in the tab row, and is representative of the tabs contained within the tab group.

Users may then interact with these tab groups displayed in the tab row. In response to receiving a user input corresponding to a tab group, one or more tab group options are presented to allow further management of the organization and display of the tab group and/or individual ones of the tabs contained within the tab group. A tab group option is then selected, and an operation corresponding to the selected tab group option is performed. The display position of these ungrouped tabs and tab groups displayed in the tab group row may further be modified by sorting the display position according to a user's specification so that the user may easily switch to interact with content corresponding to different tabs.

The tab management techniques described herein enable users of computing devices to view, share, and interact with a vast amount of content while decreasing the device's computational resources that would otherwise be required to interact with the same amount of content. For example, while a user previously may have kept open multiple windows, each supporting tabbed display environments, the techniques herein enable users to more efficiently manage tabbed content in a single window, and thereby eliminate the additional processing and memory resources required to support the additional windows supporting tabbed display environments.

Figure 1:
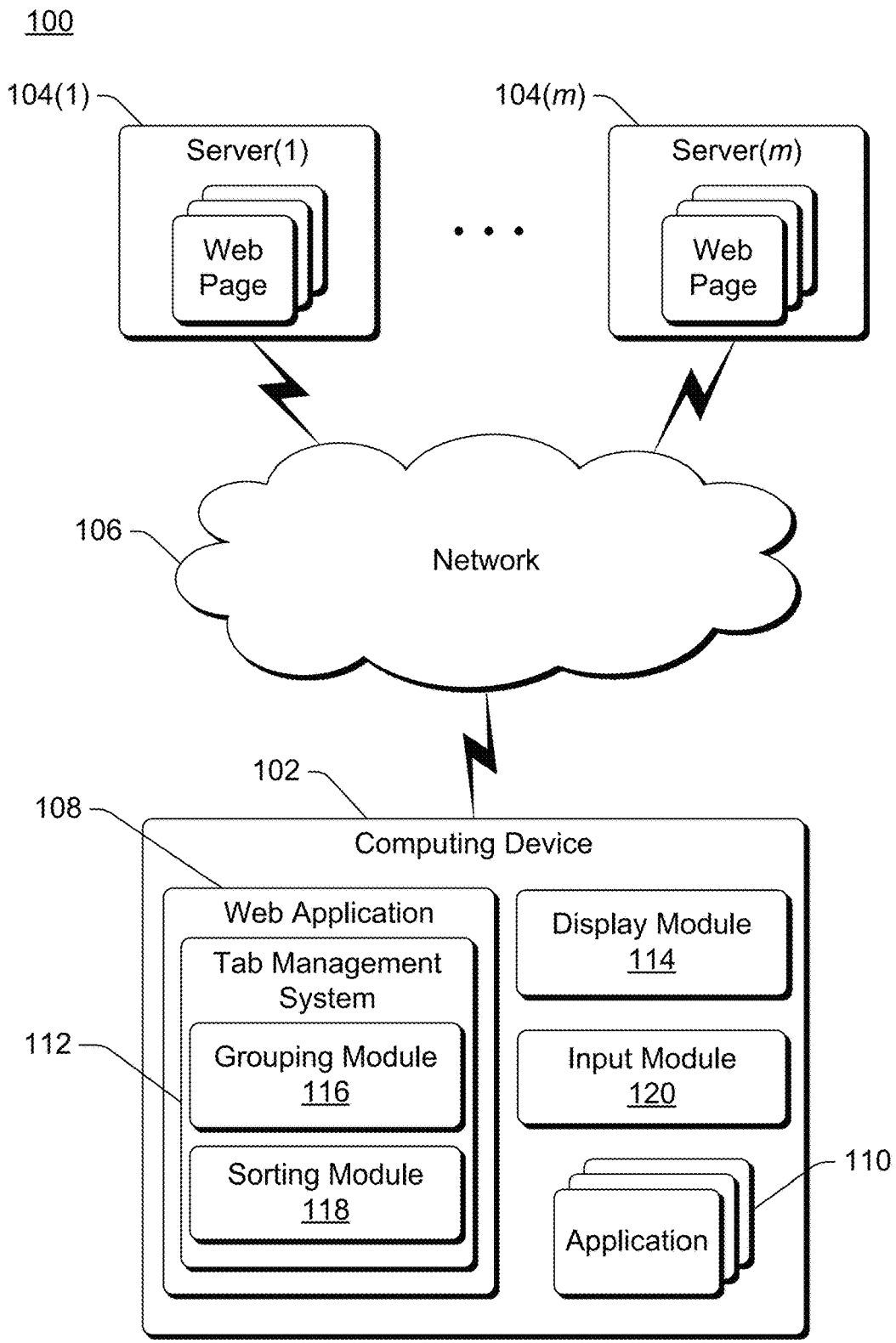
FIG. 1 illustrates an example operating environment in which various principles described herein can be employed in accordance with one or more embodiments.

FIG. 1 illustrates an operating environment 100 in which various techniques described herein can be employed in accordance with one or more embodiments. Operating environment 100 includes a computing device 102 that can communicate with one or more (m) servers 104 via a network 106. Network 106 can be a variety of different networks, including the Internet, a local area network (LAN), a cellular or other phone network, an intranet, other public and/or proprietary networks, combinations thereof, and so forth.

Computing device 102 can be a variety of different types of devices, such as a physical device or a virtual device. For example, computing device 102 can be a physical device such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch), an entertainment device (e.g., an entertainment appliance, a set-top box communicatively coupled to a display device, a game console), a television or other display device, an automotive computer, and so forth. Computing device 102 can also be a virtual device, such as a virtual machine running on a physical device. A virtual machine can be run on any of a variety of different types of physical devices (e.g., any of the various types listed above). Thus, computing device 102 may range from a full resource device with substantial memory and processor resources (e.g., personal computers, game consoles) to a low-resource device with limited memory and/or processing resources (e.g., traditional set-top boxes, handheld game consoles).

Servers 104 can be a variety of different computing devices capable of hosting Web pages or other content that can be retrieved and displayed by a Web application 108 of computing device 102. Similar to the discussion of computing device 102, servers 104 can be a variety of different devices, ranging from full resource devices with substantial memory and processor resources to low-resource devices with limited memory and/or processing resources.

Computing device 102 includes web application 108, applications 110, display module 114, and input module 120. Web application 108 includes tab management system 112, which includes grouping module 116 and sorting module 118. Although the tab management system 112 is illustrated as included in web application 108, alternatively the tab management system 112 can be implemented separate from web application 108. For example, the tab management system 112 can be implemented at the computing device 102 independent of any one of Web application 108 and/or applications 110 (e.g., as part of an operating system of computing device 102). Similarly, grouping module 116 and sorting module 118 are illustrated as included in tab management system 112 as an example only, and the functionalities of one or both of grouping module 116 and sorting module 118 may be implemented together in a tab management system 112 or separately at the computing device 102 independent of the web application 108 and/or applications 110.

In one or more embodiments, web application 108 is a web browser that obtains web pages from various websites via network 106. Alternatively, web application 108 can be other types of applications that obtain web pages or other web content from websites or other sources, such as audio/video playback applications, electronic book or magazine readers, and so forth.

Although in the description herein the various embodiments are described in the context of a specific end-user application in the form of a web application, this is done to provide the reader with a particular context in which the embodiments can be employed. It is to be appreciated and understood that the techniques described in this document can be employed in the context of other applications, other than web applications. Such other applications can include, for example, word processing applications, spreadsheet applications, email applications, visual presentation applications, and the like.

Display module 114 generates, manages, and/or outputs content for display, playback, and/or other presentation. This content can be created by display module 114 or obtained from other modules of computing device 102. This content can be, for example, a display or playback portion of a user interface (UI). The content can be displayed or otherwise played back by components of computing device 102 (e.g., speakers, interactive display devices, etc.). Alternatively, display module 104 can generate one or more signals that are output to other devices or components (e.g., speakers, display devices, etc.) that are separate from computing device 102.

Grouping module 116 groups two or more ungrouped tabs in a tab row of web application 108 displayed by display module 114 into one or more tab groups that can be displayed in the tab row by display module 114. Grouping module 116 can group ungrouped tabs in a variety of different manners, such as grouping all ungrouped tabs into a single new tab group, grouping ungrouped tabs into one or more tab groups based on a domain associated with each of the ungrouped tabs, grouping ungrouped tabs based on a position of the ungrouped tabs relative to an active tab, grouping ungrouped tabs into one or more tab groups based on an opener associated with each of the ungrouped tabs, and so on. Grouping module 116 can group ungrouped tabs based on input received at input module 120 from a user of computing device 102 and cause display module 114 to display any tabs or tab groups resulting from this grouping in the tab row of web application 108. Alternatively or additionally, a user of computing device 102 may desire to manage ungrouped tabs without grouping together multiple ones of the ungrouped tabs.

Sorting module 118 sorts two or more tabs in a tab row of web application 108 being displayed by display module 114. Sorting module 118 sorts both ungrouped tabs and tab groups of the tab row in a variety of manners that can be specified by a user of computing device 102. For example, sorting module 118 can sort ungrouped tabs and tab groups of the tab row based on a domain associated with each of the ungrouped tabs and tab groups, sort based on an opener associated with each of the ungrouped tabs and tab groups, and so forth. The manner in which sorting module 118 sorts ungrouped tabs and tab groups of a web application 108 can be specified by user input received at input module 120 of computing device 102.

Input module 120 receives user inputs from a user of computing device 102. User inputs can be provided in a variety of different manners, such as by pressing one or more keys of a keypad or keyboard of device 102, pressing one or more keys of a controller (e.g., remote control device, mouse, trackpad, etc.) of device 102, pressing a particular portion of a touchpad or touchscreen of device 102, making a particular gesture on a touchpad or touchscreen of device 102, and/or making a particular gesture on a controller (e.g., remote control device, mouse, trackpad, etc.) of device 102. User inputs can also be provided via other physical feedback input to device 102, such as tapping any portion of device 102, an action that can be recognized by a motion detection component of device 102 (such as shaking device 102, rotating device 102, etc.), and so forth. User inputs can also be provided in other manners, such as via audible inputs to a microphone, via motions of hands or other body parts observed by an image capture device, and so forth.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Additionally, although particular modules are discussed herein, it should be noted that in one or more embodiments some of these modules may not be included. For example, sorting module 118 may not be included in computing device 102 if the tab managements system 112 supports grouping tabs but not sorting tabs.

Figure 2:
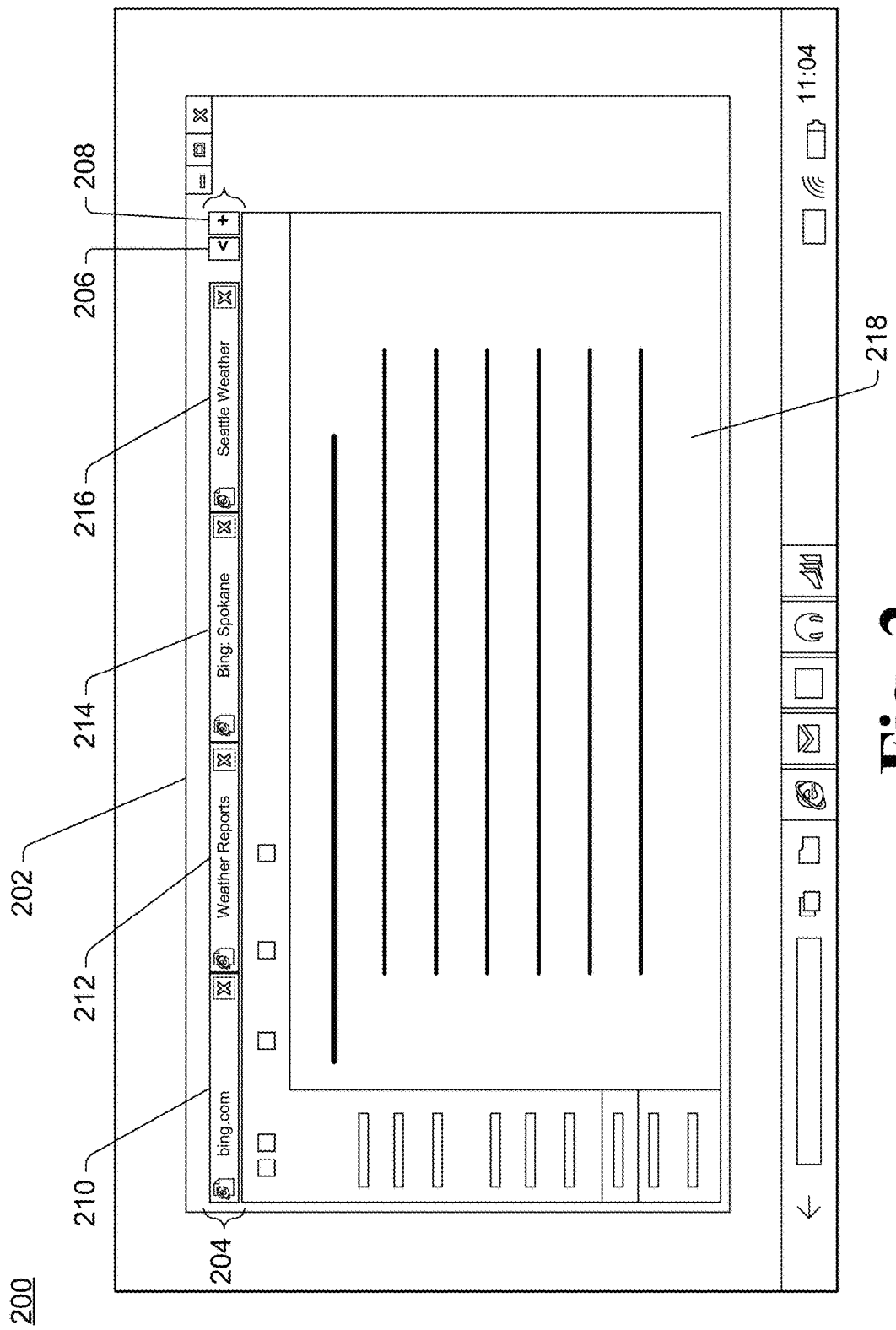
FIG. 2 illustrates an example of displaying multiple ungrouped tabs of a tab row of a user interface in accordance with one or more embodiments.

FIG. 2 illustrates an example 200 of displaying multiple ungrouped tabs of a tab row of a user interface 202 in accordance with one or more embodiments. User interface 202 includes a display of tab content 218 disposed proximal to a tab row 204. As described herein, a tab row (illustrated as tab row 204 in example 200) refers to a designated display area that can display one or more tabs, one or more tab groups, and one or more tab controls for the display of and interaction with tab content 218 (e.g., the area 204 denoted by braces to the left of tab 210 and to the right of tab control 208 that includes tab management control 206, new tab control 208, and tabs 210, 212, 214, and 216). Although the present example describes tab row 204 in a horizontal layout, it should be noted that a tab row may display its tabs, tab groups, and tab controls in a variety of other layouts, (e.g., arranged vertically in a column fashion). In some embodiments, the tab row may be displayed so that a user may visually discern the area comprising the tab row from other areas of the user interface 202, such as tab content 218. The tab content 218 corresponds to a display of content associated with an active tab in the tab row. In the present example, user interface 202 is a web application and each tab is ungrouped and associated with a different web page. Assuming that tab 214 is the active tab in this web application example, tab content 218 would display content from the corresponding web page "Bing: Spokane".

It should be noted that although four tabs are illustrated in FIG. 2, the functionality of the tab management control operates the same so long as there are multiple ungrouped tabs in the tab row, regardless of the number of tabs in the tab row. Functionality of the tab management control may also include grouping ungrouped tabs that are not currently displayed in the user interface 202 (e.g., when the number of open tabs exceeds a maximum number of tabs that can be displayed in the tab row). In certain embodiments where the tab row includes only one ungrouped tab, functionality of the tab management control may be disabled.

Figure 3:
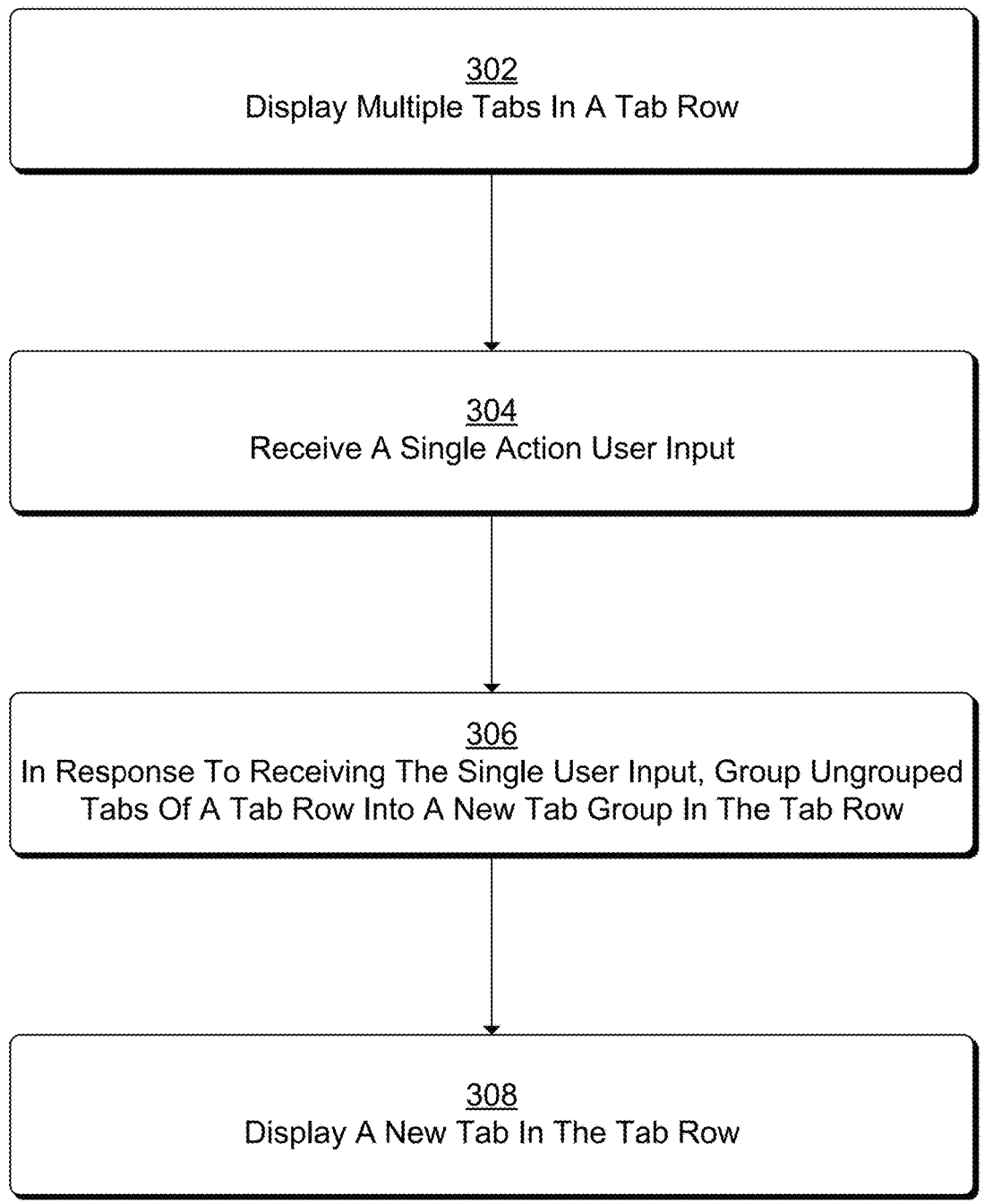
FIG. 3 is a flowchart illustrating an example process for grouping multiple tabs displayed in a tab row into a tab group in accordance with one or more embodiments.

FIG. 3 is a flowchart illustrating an example process 300 for grouping multiple tabs displayed in a tab row into a tab group in accordance with one or more embodiments. Process 300 can be implemented in software, firmware, hardware, or combinations thereof. For example, process 300 can be implemented by the tab management system 112 illustrated in FIG. 1. Process 300 is shown as a set of acts and is not limited to the order shown for performing the operations of various acts. Process 300 is an example process for grouping multiple tabs displayed in a tab row into a tab group; additional discussions of grouping multiple tabs displayed in a tab row into a tab group are included herein with reference to different figures.

In process 300, multiple tabs are displayed (act 302) in a tab row of a user interface. Each of the multiple tabs corresponds to content from different resource locations. Alternatively, two or more of the multiple tabs may be duplicates of one another in that the two or more tabs correspond to content from the same resource location. As described herein, a resource location refers to a location that hosts, stores, or otherwise supports content such that a computing device may access and/or interact with the content. A resource location is commonly indicated by a URI (Uniform Resource Identifier), which is a generic term for all types of names and address that refer to content on the World Wide Web. The resource location may be remote from a computing device implementing process 300 (e.g., accessible from a server 104 via a network 106 as illustrated in FIG. 1) or local to the computing device (e.g., a web application 108 or applications 110 located on computing device 102 as illustrated in FIG. 1).

A single action user input is received (act 304). The single action user input can be received by input module 120 of FIG. 1, and includes any of the manners of input discussed above. As described herein, a single action user input refers to any form of input that a user can input at a computing device via a single action. For example, the single action user input may be a left click on a control or icon, a single action gesture on a trackpad or touchscreen of the user's device such as a finger swipe, and so on. In contrast, a multiple action user input comprises multiple actions, such as a double-click, a double tap on a touchscreen or trackpad, a drag-and-drop gesture, and so on.

In response to receiving the single action user input, ungrouped ones of the multiple tabs displayed in the tab row are grouped into a new tab group in the tab row (act 306). The system implementing process 300 may further discern in act 306 between different ones of single action user inputs so that the grouping is performed only in response to certain types of single action user inputs (e.g., grouping in response to receiving a left-click input but performing an action other than grouping in response to receiving a right-click input). As part of this grouping, the new tab group is displayed as visually discernable from an ungrouped tab in the tab row. For example, displaying a tab group as visually discernable from an ungrouped tab in the tab row may include displaying, at the tab group, a numerical value indicating a number of tabs in a group, displaying a tab group in a different color than an ungrouped tab color, displaying a tab group as multiple ungrouped tabs in a cascaded display, and so on.

This grouping in act 306 reduces the space required for the user interface on the computing device due to the multiple tabs being condensed or grouped into a tab group (e.g., a single tab group being displayed instead of the multiple tabs). This grouping in act 306 also reduces the number of tabs displayed (e.g., a single tab group is displayed instead of the multiple tabs), increasing the efficiency of user interaction with the computing device by decreasing the number of tabs that are displayed.

A new tab is also displayed in the tab row (act 308). The new tab may automatically open to a default resource location, such as a web page in a web application implementation or a blank document in a word processing application implementation. Default settings for a new tab display location and content associated with the new tab may be configured by a user so that a user may personalize how a new tab is displayed in the tab row.

Figure 4:
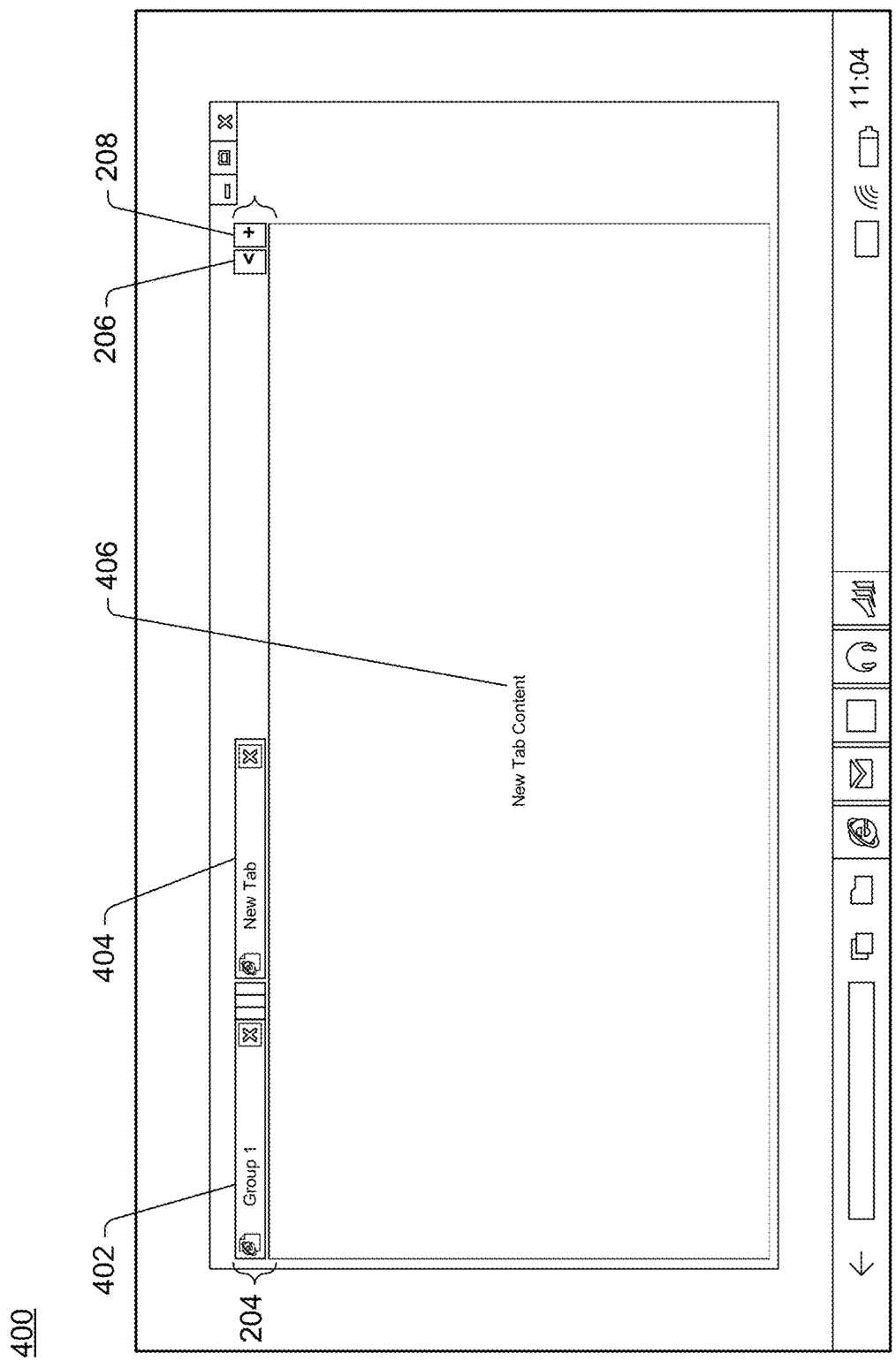
FIG. 4 illustrates an example of the multiple ungrouped tabs of the tab row grouped into a new group in accordance with one or more embodiments.

FIG. 4 illustrates an example 400 of a tab group of the tab row displayed adjacent to a new tab of the tab row in accordance with one or more embodiments. In example 400, in response to a single action user input at tab management control 206 (e.g., a user input clicking on or touching tab management control 206), new tab group 402 is displayed in the tab row 204. In the present example, the default functionality of the tab management control 206 is to group all ungrouped tabs into a new group. Tab group 402 includes ungrouped tabs 210, 212, 214, and 216 of FIG. 2 and is displayed as visually discernable from an ungrouped tab in the tab row. Tab group 402 is displayed instead of the ungrouped tabs 210, 212, 214, and 216. New tab 404 is automatically displayed as a result of grouping all ungrouped tabs into tab group 402. New tab 404 is automatically made active and new tab content 406 is displayed in the user interface. Although not depicted, tab group 402 may display a visual indication of a number of tabs grouped within the tab group.

Grouping all ungrouped tabs into a new group is one example of functionality associated with the single action user input. It should be noted that this example is not intended to limit and should not be construed as limiting the functionality associated with the single action user input. In response to receiving the single action user input, a variety of other actions may be carried out, such as grouping ungrouped tabs into one or more tab groups based on a domain associated with each of the ungrouped tabs, grouping ungrouped tabs based on a position of the ungrouped tabs relative to an active tab, grouping ungrouped tabs into one or more tab groups based on an opener associated with each of the ungrouped tabs, and so on. The manner in which these additional functionalities are carried out is discussed in more detail below.

Figure 5:
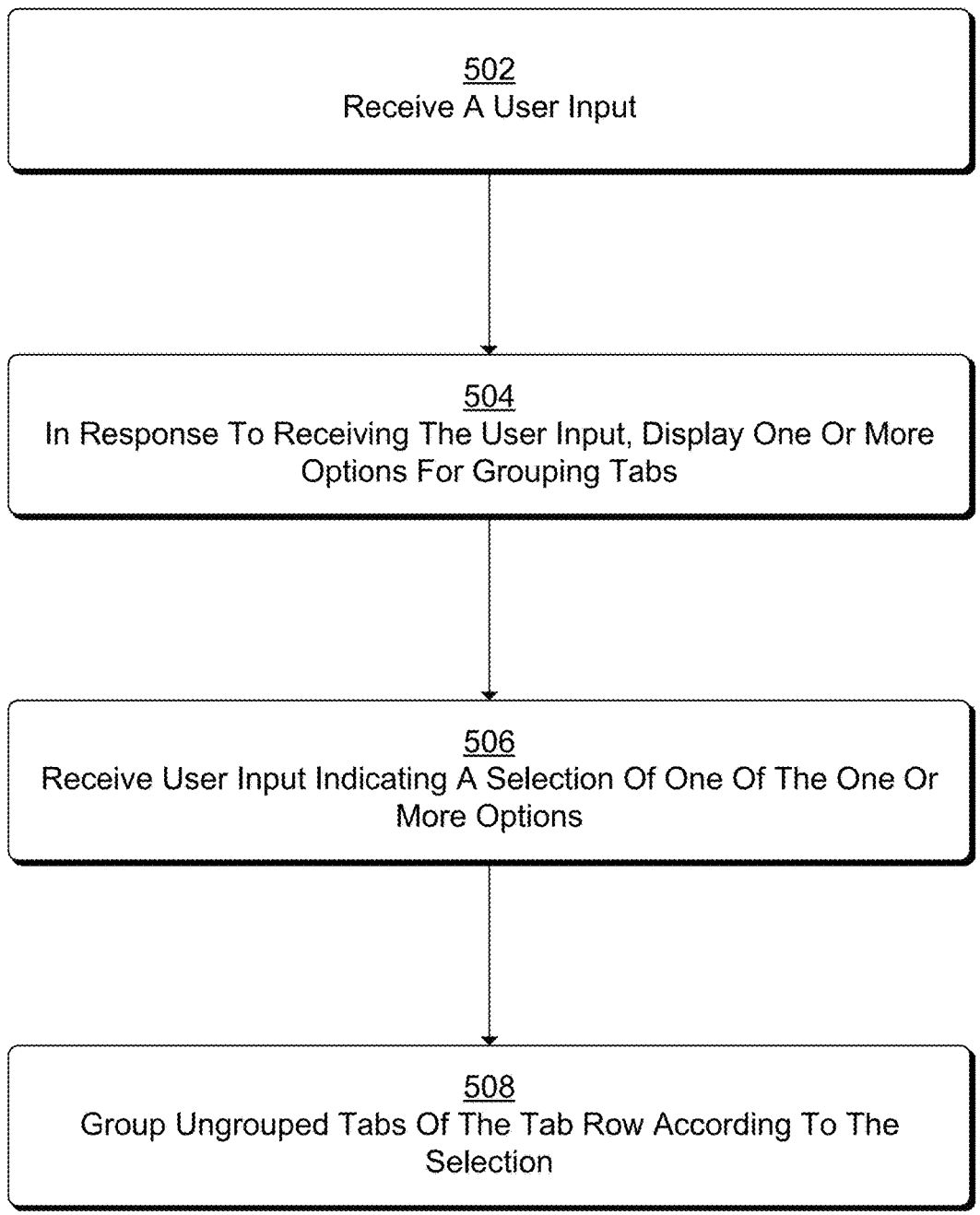
FIG. 5 is a flowchart illustrating an example process for grouping ungrouped tabs of a tab row according to a user selection in accordance with one or more embodiments.

FIG. 5 is a flowchart illustrating an example process 500 for grouping ungrouped tabs of a tab row according to a user selection in accordance with one or more embodiments. Process 500 can be implemented in software, firmware, hardware, or combinations thereof. For example, process 500 may be implemented by the grouping module 116 of tab management system 112 illustrated in FIG. 1. Process 500 is shown as a set of acts and is not limited to the order shown for performing the operations of various acts. Process 500 is an example process for grouping ungrouped tabs of a tab row according to a user selection; additional discussions of grouping ungrouped tabs of a tab row according to a user selection are included herein with reference to different figures.

In process 500, a user input is received (act 502). The user input can be received in any of the variety of manners described above.

One or more options for grouping tabs are displayed in response to receiving the user input (act 504). This user input includes any type of suitable input, and may be either a single action user input or a multiple action user input. The system implementing process 500 may discern at act 504 between different ones of user inputs so that the options are displayed only in response to certain types of user inputs (e.g., displaying the one or more options in response to receiving a right-click input but performing an action other than displaying the one or more options in response to receiving a left-click input). In one or more embodiments, the one or more options for grouping tabs are displayed at a corresponding location of a display where the user input was received so that a user can easily select one of the options without having to direct their attention to a different area of the display. However, it should be noted that the options may be displayed at any location in a display area of a computing device implementing process 500.

A user input indicating a selection of one of the one or more options is received (act 506). This user input indicating a selection of one of the one or more options can be received in any of the variety of manners described above.

Responsive to receiving the user input indicating a selection of one of the one or more options, ungrouped tabs of the tab row are grouped according to the selection (act 508).

This grouping in act 508 reduces the space required for the user interface on the computing device due to multiple tabs being condensed or grouped into a tab group (e.g., a single tab group being displayed instead of the multiple tabs). This grouping in act 508 also reduces the number of tabs displayed (e.g., a single tab group is displayed instead of the multiple tabs), increasing the efficiency of user interaction with the computing device by decreasing the number of tabs that are displayed.

Figure 6:
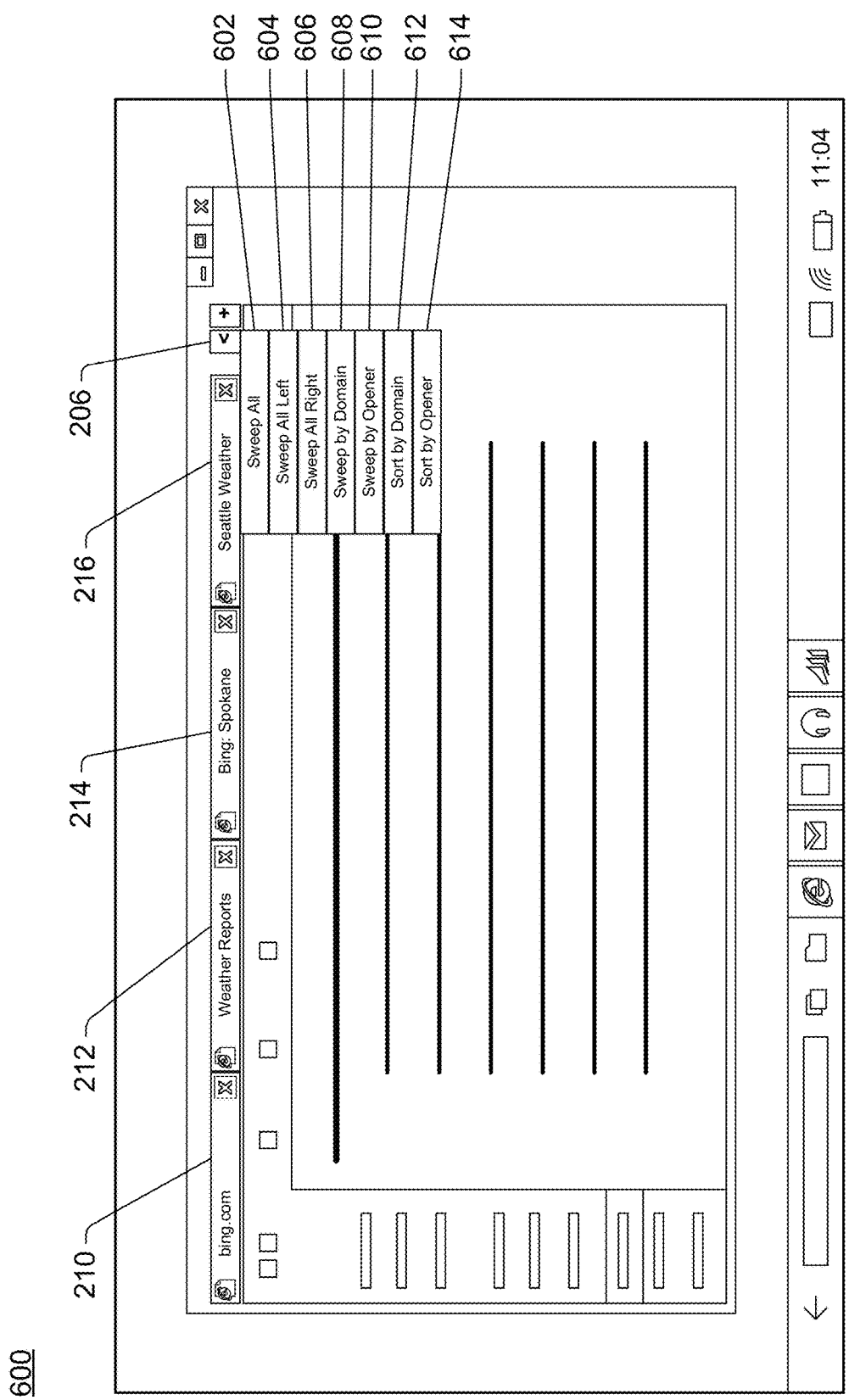
FIG. 6 illustrates an example of displaying multiple options for grouping ungrouped tabs of a tab row in accordance with one or more embodiments.

FIG. 6 illustrates an example of displaying one or more options for managing ungrouped tabs of a tab row in accordance with one or more embodiments. In the present example, responsive to receiving a user input at tab management control 206, options 602, 604, 606, 608, 610, 612, and 614 for managing tabs are displayed.

Option 602 presents an option to group all ungrouped tabs displayed in the tab row into a tab group, as described above with reference to FIG. 4.

Option 604 presents an option to group all ungrouped tabs located to the left of an active tab in the tab row into a tab group. In the present example, tab 214 is the active tab. In response to selection of option 604, all ungrouped tabs displayed to the left of tab 214 are grouped into a tab group. Continuing the present example, the "bing.com" and "Weather Reports" tabs would be grouped into a tab group in response to selection of option 604 because they are displayed to the left of tab 214 in the tab row. Alternatively, tab 214 may also be grouped into the tab group in response to selection of option 604.

Figure 7:
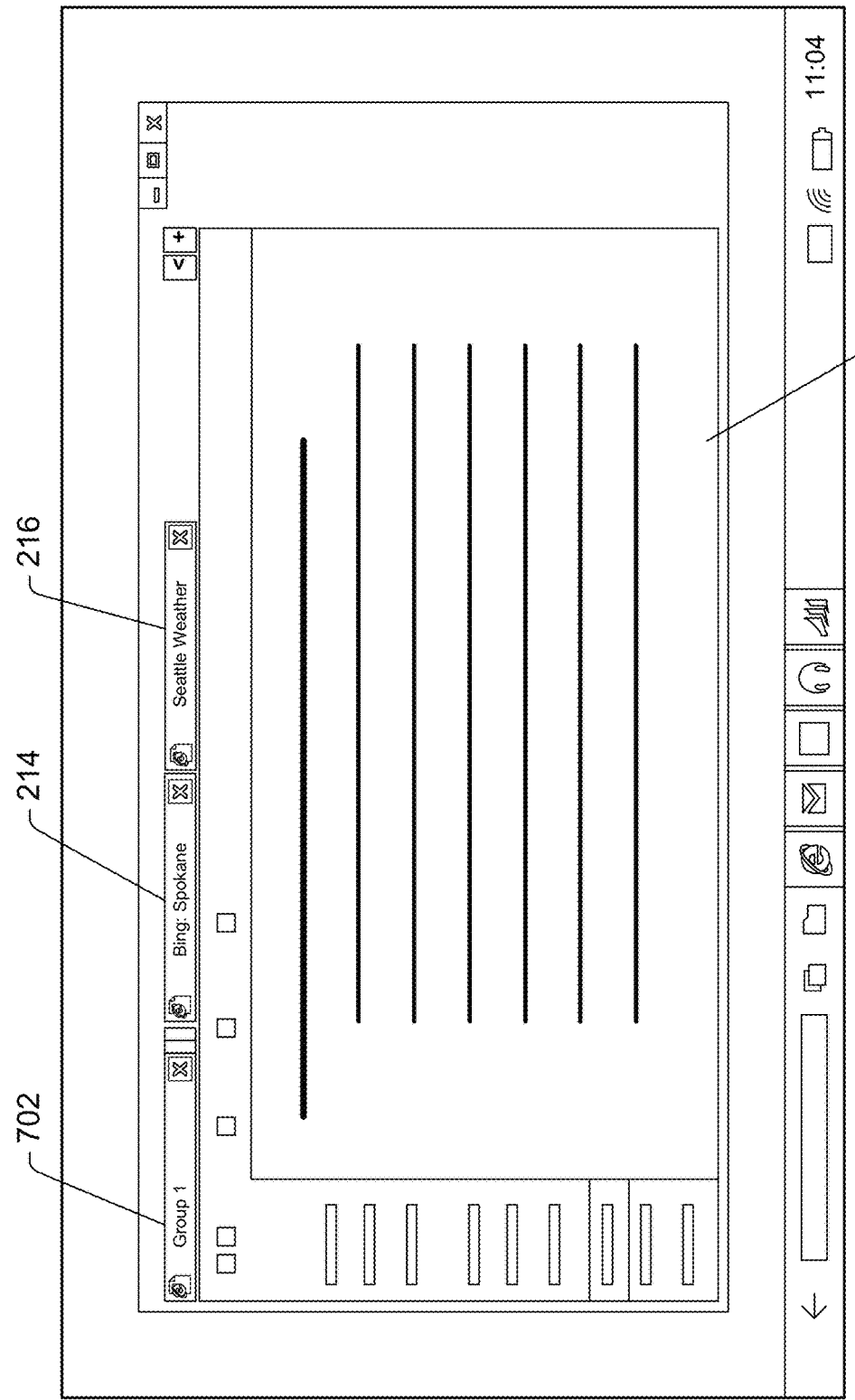
FIG. 7 illustrates an example of the multiple ungrouped tabs of the tab row grouped according to a user selection in accordance with one or more embodiments.

FIG. 7 illustrates an example 700 of the multiple ungrouped tabs of the tab row grouped according to a user selection in accordance with one or more embodiments. In example 700, ungrouped tabs of the tab row disposed to the left of active tab 214 are grouped into group 702 responsive to user selection of "Sweep All Left" option 604. In this example, active tab 214 remains ungrouped and content 218 associated with active tab 214 is displayed in the user interface. Alternatively, as described above, option 604 may perform its grouping inclusive of active tab 214. In this alternate example, group 702 includes tab 214, tab 216 becomes the active tab, and content 218 corresponding to tab 216 is displayed in the user interface.

Returning to FIG. 6, option 606 presents an option to group all ungrouped tabs located to the right of an active tab in the tab row into a tab group. In the present example, tab 214 is the active tab. In response to selection of option 604, any ungrouped tabs displayed to the right of tab 214 are grouped into a tab group. Alternatively, tab 214 may also be grouped into the tab group in response to selection of option 604.

Option 608 presents an option to group all ungrouped tabs displayed in the tab row into one or more tab groups based on a respective domain associated with the ungrouped tab, as is further described with reference to FIG. 8. In a web application example, a domain corresponds to a top-level website from which sub-level websites, or pages, within the domain can be accessed. For example, MSN.com is a top-level website associated with the URL MSN.com as well as the domain MSN. By way of contrast, MSN.com/Sports is also associated with the domain MSN, but is a sub-level website, or page, associated with the URL MSN.com/Sports.

Figure 8:
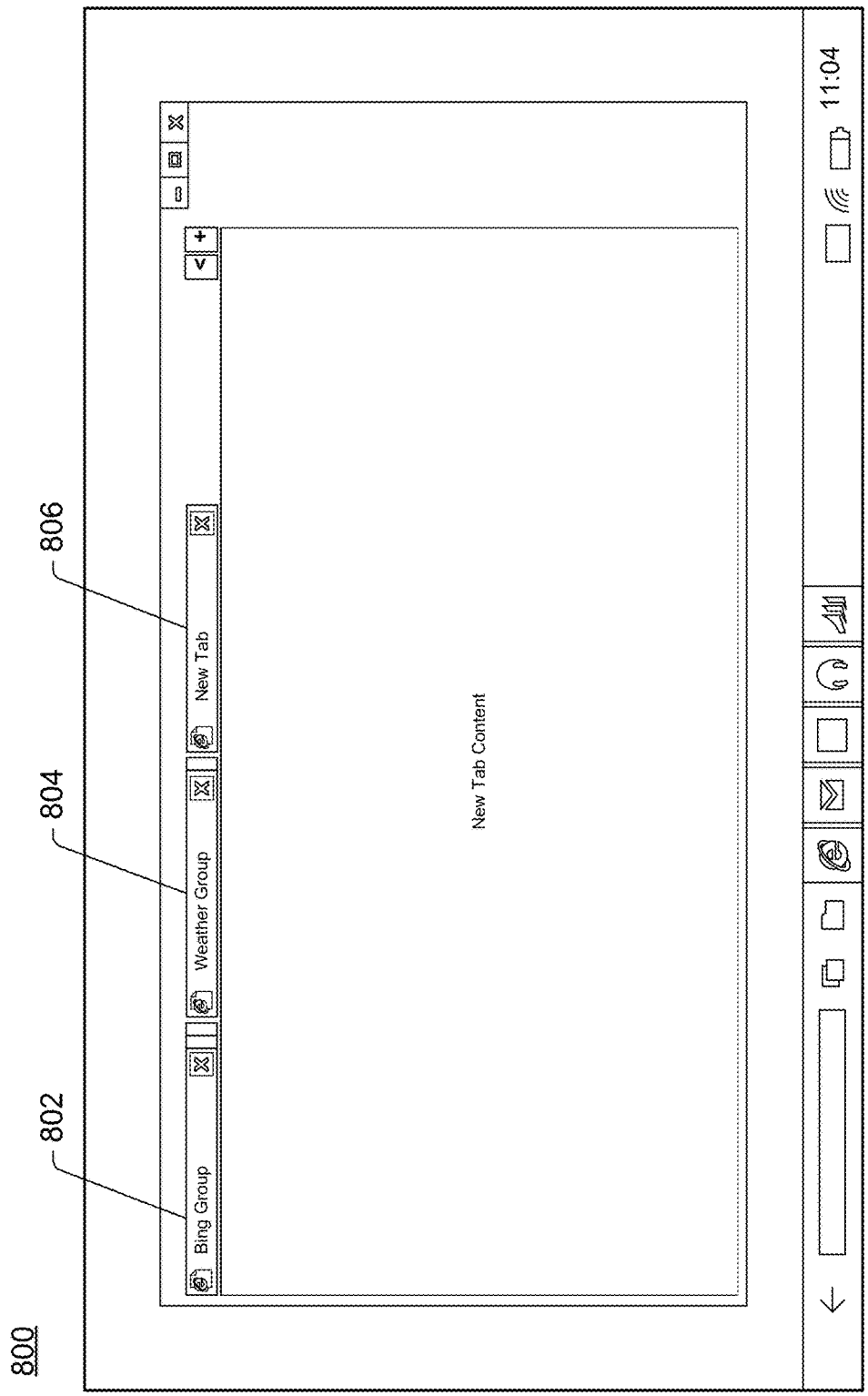
FIG. 8 illustrates an example of the multiple ungrouped tabs of the tab row grouped according to a user selection in accordance with one or more embodiments.

FIG. 8 illustrates an example 800 of the multiple ungrouped tabs of the tab group row grouped according to a user selection in accordance with one or more embodiments. In example 800, ungrouped tabs of the tab row are grouped into groups 802 and 804 responsive to user selection of option 608 "Sweep by Domain". Tab groups 802 and 804 represent grouped tabs that have a common domain. Continuing this example, group 802 includes tabs 210 ("bing.com") and 214 ("Bing: Spokane"), and group 804 includes tabs 212 ("Weather Reports") and 216 ("Seattle Weather"). Ungrouped tabs of the tab row are grouped together if the ungrouped tabs share a common domain. In certain embodiments, tab groups 802 and 804 are automatically labeled based on the common domain shared by individual tabs of the tab group. For example, tab group 802 is automatically labeled "Bing Group" based on a common domain of tabs 210 and 214 (e.g., http://www.bing.com). Alternatively or additionally, a user may customize how tab groups are automatically named.

In example 800, new tab 806 is displayed responsive to all ungrouped tabs in the tab row being grouped into one or more tab groups. In some situations embodiments, one or more ungrouped tabs in the tab row may not share a common domain with any of the other ungrouped tabs in the tab row. In these situations, selection of option 608 creates one or more groups in the tab row for any two or more tabs in the tab row that share a common domain. Display of ungrouped tabs that do not share a common domain with any other ungrouped tab are unaffected by selection of option 608. Alternatively, ungrouped tabs that do not share a common domain with any other ungrouped tab may be grouped together into a tab group and labeled accordingly (e.g., "Miscellaneous Group").

Returning to FIG. 6, option 610 presents an option to group all ungrouped tabs displayed in the tab row into one or more tab groups based on an opener associated with the tab. In a web application example, an opener corresponds to a top-level website from which other top-level websites and sub-level websites can be accessed. By way of contrast to grouping ungrouped tabs based on domain, discussed above, grouping ungrouped tabs based on an opener associated with the tab is performed independent of a domain associated with the tab. For example, in a web application where individual tabs are associated with different web pages, user interaction with a link on a first web page may cause a second web page to open in an additional tab. From this second web page opened in the additional tab, user interaction with a second link at the second web page may cause a third web page to open in a further additional tab, and so on. Additionally, a user may open a fourth web page independent of an input at the first, second, or third web pages. The user may further interact with the fourth web page to open a fifth web page. In this example, the first and fourth web pages would be "opener" web pages. The first web page is the opener for the second and third web pages, and the fourth web page is the opener for the fifth web page. Continuing this example, grouping all ungrouped tabs based on an opener would group tabs corresponding to the first, second, and third web pages into one group and group tabs corresponding to the fourth and fifth webpages into a second group.

Option 612 presents an option to sort all ungrouped tabs displayed in the tab row based on a respective domain associated with the ungrouped tab, as is further described below.

Option 614 presents an option to sort all ungrouped tabs displayed in the tab row based on a respective opener associated with the ungrouped tab, as is further described below.

It should be noted that although seven tab management options are illustrated in FIG. 6, the tab management options described are disclosed as examples and are not exhaustive of tab management options that can be displayed or intended to limit the tab management techniques described herein. Additionally, it should be noted that not all embodiments include all seven tab management options. For example, option 608 "Sweep by Domain" and/or option 610 "Sweep by Opener" may not be included. Furthermore, although the present example illustrates displaying the one or more options responsive to receiving a user input at tab management control 206, the one or more options may also be displayed responsive to receiving a user input elsewhere at the tab row (e.g., at an ungrouped tab displayed in the tab row).

In addition, in the discussion above regarding FIGS. 2 and 4, reference is made to the default functionality of the tab management control 206 being to group all ungrouped tabs into a new group. Alternatively, the default functionality of the tab management control 206 can be the functionality described herein with reference to any of the options 604, 606, 608, 610, 612 or 614.

After creating one or more tab groups, a user may wish to interact with one of the one or more tab groups to further manage and or interact with individual ones of the ungrouped tabs grouped together in a tab group. For example, a user may have inadvertently included one too many tabs that were not intended to be grouped into a tab group. Alternatively or additionally, a user may wish to expand a tab group to view individual tabs of a tab group, collapse an expanded tab group, close a tab group, share a tab group, favorite a tab group, and so on.

Figure 9:
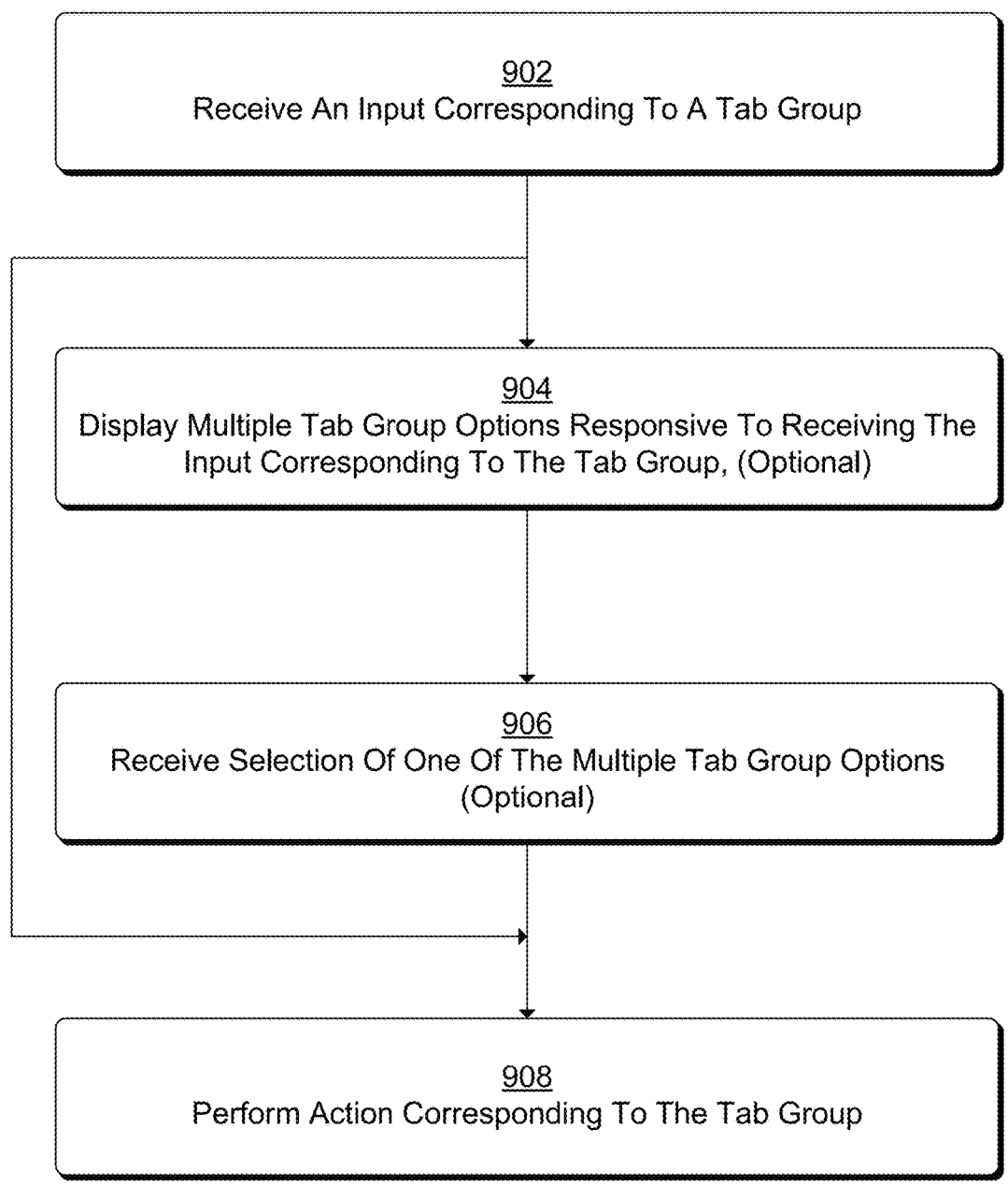
FIG. 9 is a flowchart illustrating an example process for performing an action corresponding to a tab group in accordance with one or more embodiments.

FIG. 9 is a flowchart illustrating an example process for performing an action corresponding to a tab group in accordance with one or more embodiments. Process 900 can be implemented in software, firmware, hardware, or combinations thereof. For example, process 900 can be implemented by the tab management system 112 illustrated in FIG. 1. Process 900 is shown as a set of acts and is not limited to the order shown for performing the operations of various acts. Process 900 is an example process for performing an action corresponding to a tab group; additional discussions of performing an action corresponding to a tab group are included herein with reference to different figures.

In process 900, an input corresponding to a tab group is received (act 902). The input may be received in any of the variety of manners described above, and can be received by input module 120 illustrated in FIG. 1. For example, the input may be a right click on a tab group displayed in a tab row, a double tap, a tap-and-drag gesture, and so on. In one or more embodiments, the input corresponding to the tab group may be indicated by input module 120 detecting an input at a display area that corresponds to a display area of the tab group in the tab row.

Optionally, multiple tab group options are displayed in response to receiving the input corresponding to the tab group (act 904).

Optionally, a selection of one of the multiple tab group options is received (act 906).

An action corresponding to the tab group is performed (act 908). In embodiments where multiple tab group options are displayed and one of the multiple tab group options is selected, the system implementing process 900 performs at act 908 an action corresponding to the selected option.

Figure 10:
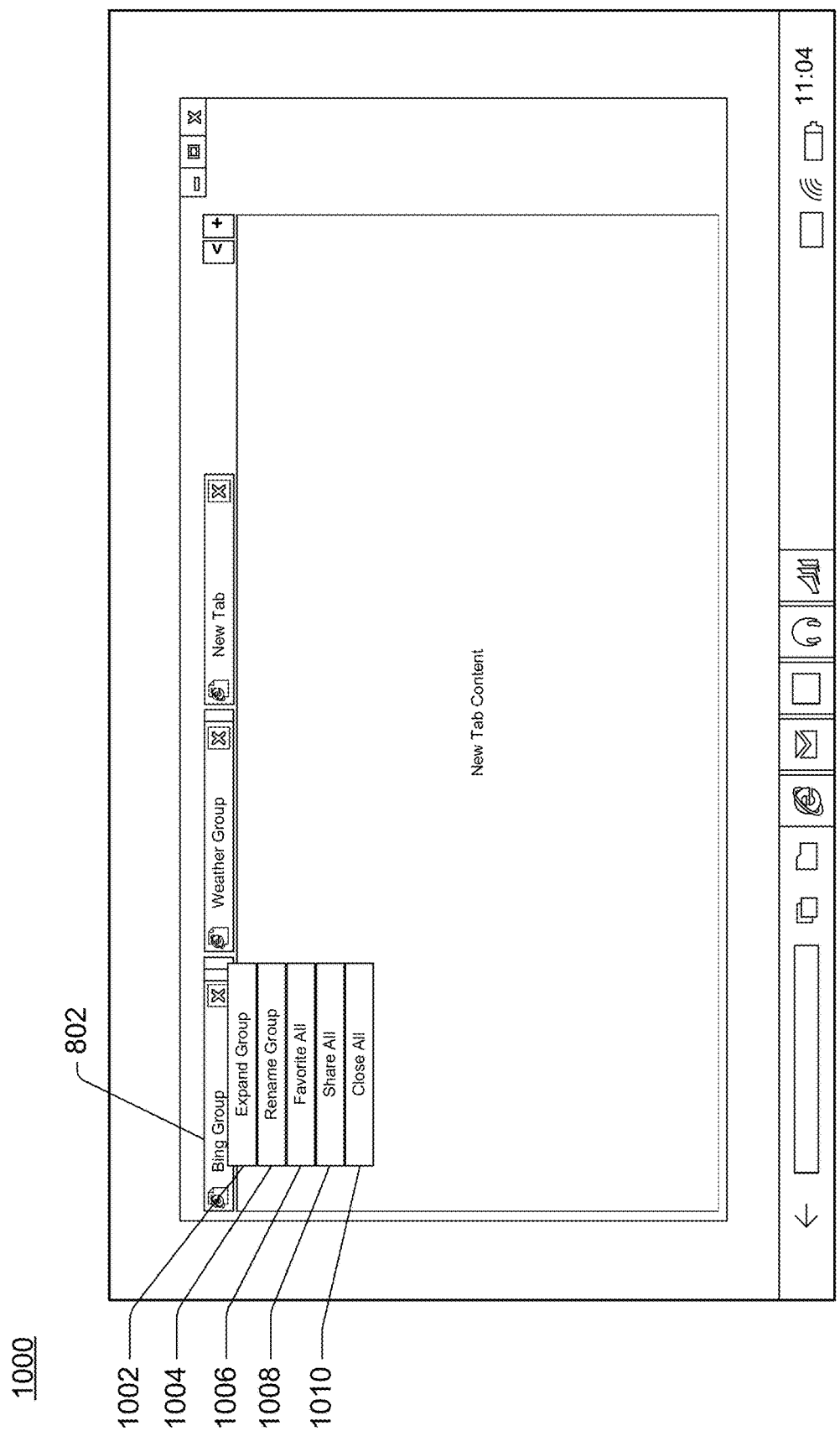
FIG. 10 illustrates an example of displaying multiple options for performing an action corresponding to a tab group in accordance with one or more embodiments.

FIG. 10 illustrates an example 1000 of displaying one or more options for performing an action corresponding to a tab group in accordance with one or more embodiments. In example 1000, responsive to receiving a user input at tab group 802, one or more tab group options 1002, 1004, 1006, 1008, and 1010 are displayed.

Option 1002 presents an option to expand a tab group. Expanding a tab group includes displaying the multiple tabs of the tab group as ungrouped tabs in the tab row with a visual indication that the multiple tabs of the tab group are grouped together. The visual indication may be any sort of visual indication such as an outline, shading, color-coding, and so on. A further discussion of expanding a tab group is described below with respect to FIGS. 11 and 12.

Option 1004 presents an option to rename the tab group. In at least some embodiments, a user may edit or rename a displayed tab group name in response to selecting option 1004.

Option 1006 presents an option to designate the multiple tabs of a tab group as a "favorite". Designating a tab group as a favorite may create and/or store resource locations for each of the multiple tabs of the tab group for later access. For example, in a web application implementation, designating a tab group as a favorite may create one or more representations of the tab group and/or multiple tabs of the tab group for display in a favorites list or bookmarks list.

Option 1008 presents an option to share the multiple tabs of a tab group. In at least some embodiments, links corresponding to each of the multiple tabs of the tab group are created and made available for a user to share. These links may be made available for sharing in a variety of manners, such as copied to a messaging service implemented at the device, stored in a document, transmitted via e-mail, posted to a social networking service, and so on.

Option 1010 presents an option to close all multiple tabs of the tab group. For example, the multiple tabs of the tab group would be closed and removed from display in the tab row in response to selection of option 1010.

It should be noted that although five tab group options are illustrated in FIG. 10, the tab group options described are disclosed as examples and are not exhaustive or intended to limit the techniques described herein. Additional tab group options may be displayed, and/or one or more tab group options displayed in FIG. 10 may not be displayed.

A user may take advantage of these options to further manage and interact with individual ones of tabs that have been grouped into a tab group. For example, a user may want to view the individual tabs of only one tab group when many tab groups are displayed in the tab row. In this instance, a user may select option 1002 to expand a particular one of the tab groups. Performing the action corresponding to the group increases the efficiency of user interaction with the computing device by allowing actions to be performed on a group of tabs as desired by the user, rather than having the user act on each different tab in the group individually.

Figure 11:
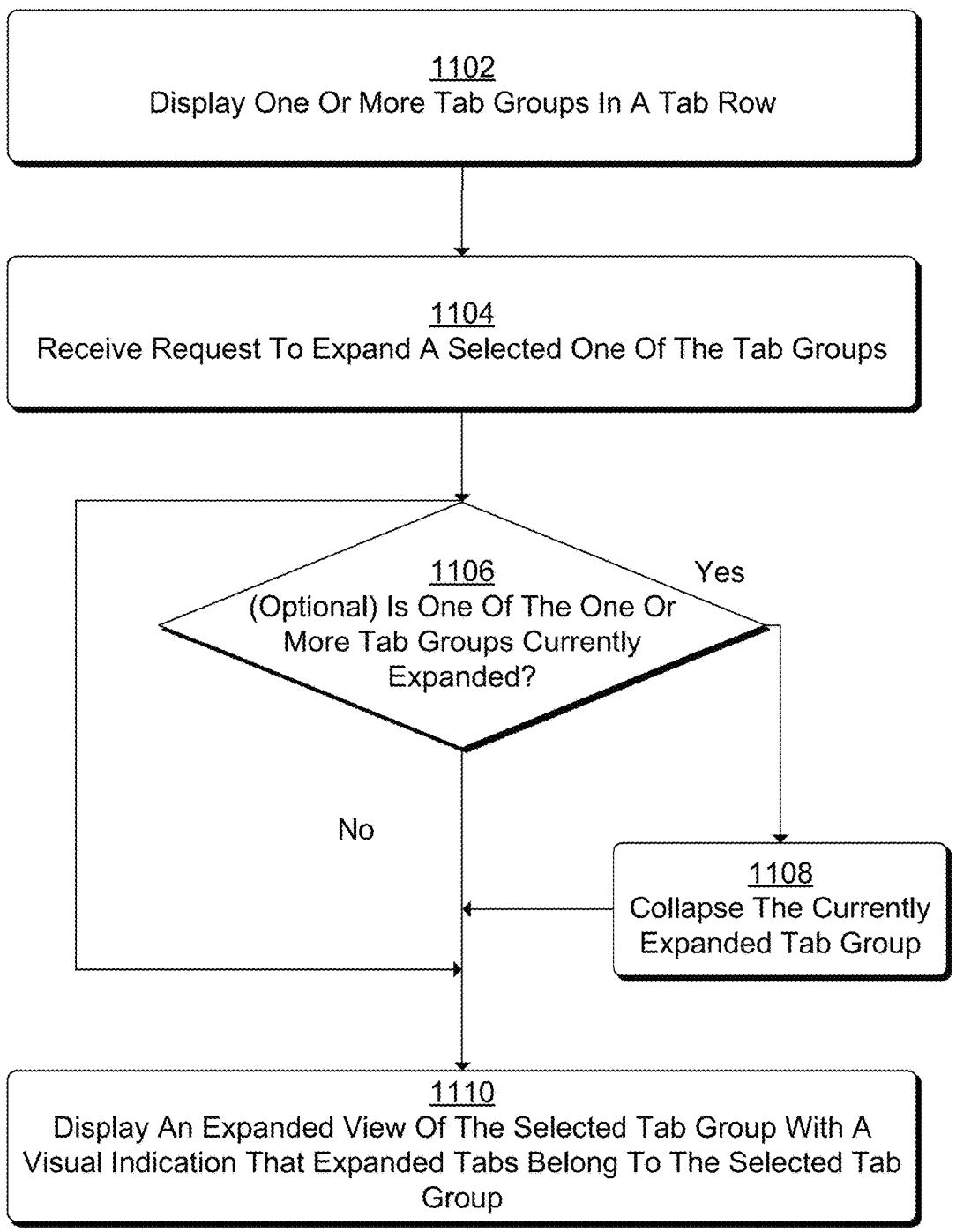
FIG. 11 is a flowchart illustrating an example process for expanding a tab group in a tab row in accordance with one or more embodiments.

FIG. 11 is a flowchart illustrating an example process 1100 for expanding a tab group in a tab row in accordance with one or more embodiments. Process 1100 can be implemented in software, firmware, hardware, or combinations thereof. Process 1100 is shown as a set of acts and is not limited to the order shown for performing the operations of various acts. Process 1100 is an example process for expanding a tab group in a tab row; additional discussions of expanding a tab group in a tab row are included herein with reference to different figures.

In process 1100, one or more tab groups are displayed in a tab row (act 1102).

A request to expand a selected one of the one or more tab groups is received (act 1104).

Optionally, process 1100 checks to see if one of the one or more tab groups is currently expanded in the tab row (act 1106).

If process 1100 determines that one of the one or more tab groups is currently expanded in the tab row, the currently expanded tab group is collapsed and displayed as a tab group in the tab row (act 1108).

Process 1100 then displays an expanded view of the selected tab group in the tab row with a visual indication that expanded tabs of the tab group belong to the selected tab group (act 1110).

Figure 12:
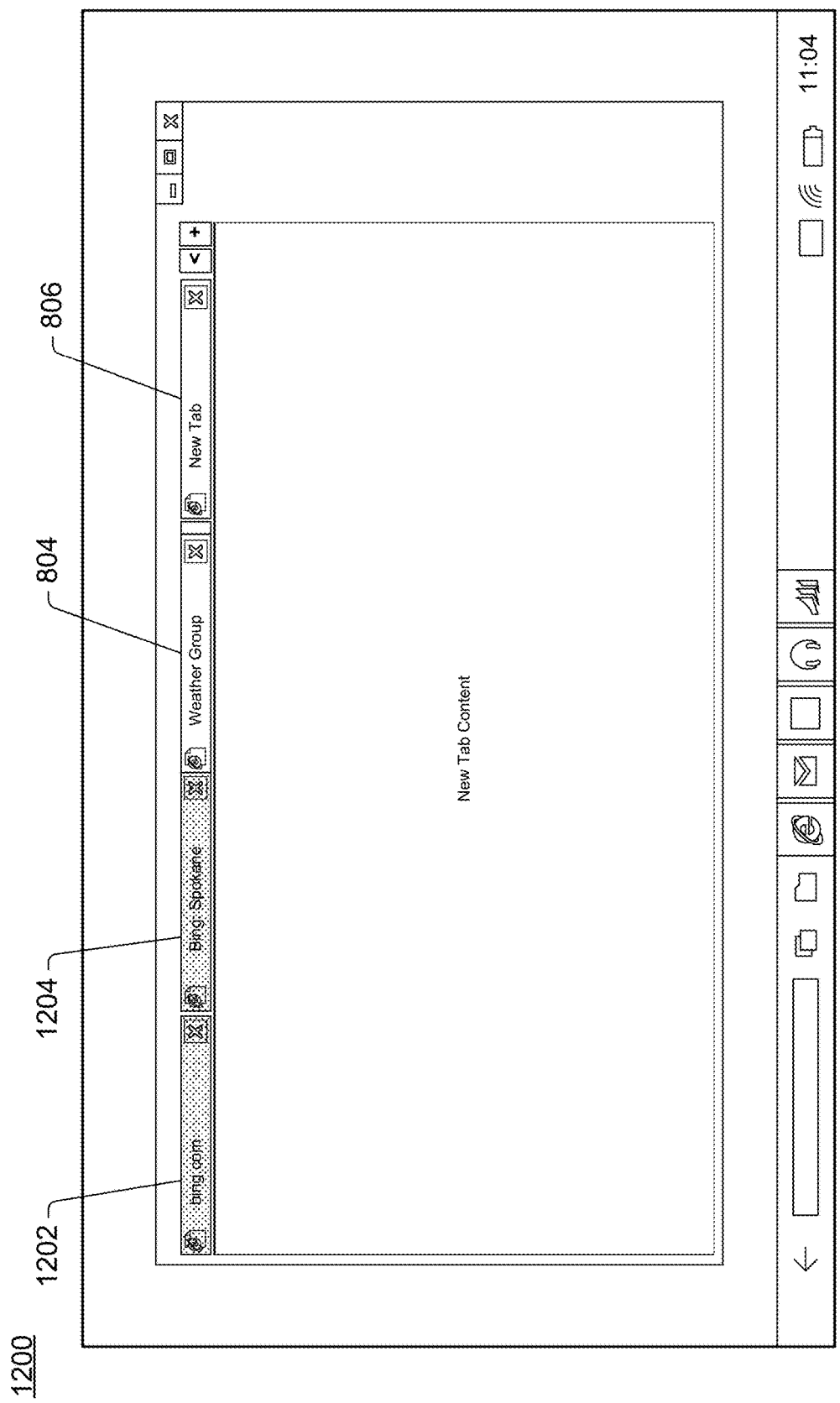
FIG. 12 illustrates an example of displaying an expanded tab group in the tab row in accordance with one or more embodiments.

FIG. 12 illustrates an example 1200 of displaying an expanded tab group in the tab row in accordance with one or more embodiments. In example 1200, a tab group (e.g., tab group 802 of FIG. 8) includes tabs 1202 and 1204. Responsive to receiving a request to expand tab group 802, tabs 1202 and 1204 are displayed in the tab row with a visual indication that tabs 1202 and 1204 belong to a common tab group (tab group 802). In the present example, the visual indication is a shading of tabs 1202 and 1204. However, as described above, the visual indication may be any indication that visually discerns expanded tabs of a tab group in the tab row from unexpanded tab groups (e.g., tab group 804) and ungrouped tabs (e.g., tab 806). While the present example illustrates tab 806 as the active tab, in certain implementations one of the multiple tabs of an expanded tab group may automatically be made the active tab in response to receiving a request to expand the tab group. The active tab may be automatically selected based on a variety of considerations (e.g., based on a most recent accessed tab, based on whether a tab of an expanded tab group is a "favorite" tab, and so forth).

FIG. 13 is a flowchart illustrating an example process 1300 for changing a display based on inputs to a tab row in accordance with one or more embodiments. Process 1300 can be implemented in software, firmware, hardware, or combinations thereof. For example, process 1300 may be implemented by tab management system 112 of FIG. 1. Process 1300 is shown as a set of acts and is not limited to the order shown for performing the operations of various acts. Process 1300 is an example process for changing a display based on inputs to a tab row; additional discussions of changing a display based on inputs to a tab row are included herein with reference to different figures.

In process 1300, one or more tabs or tab groups are displayed in a tab row (act 1302).

An input corresponding to one or more of the tabs and/or tab groups in the tab row is received (act 1304). The input can correspond to different operations, such as displaying a peek view, adjusting a display position of a tab in a tab row, and so forth as discussed in more detail below.

The display is changed in response to the received input (act 1306). The display can be changed in different manners, such as by displaying a peek view, displaying a tab in a different position in the tab row, and so forth. Changing the display in act 1306 increases the efficiency of user interaction with the computing device in different manners, such as by providing additional information to the user allowing the user to more quickly access the information he or she desires, or by decreasing the number of tabs that are displayed.

Figure 14:
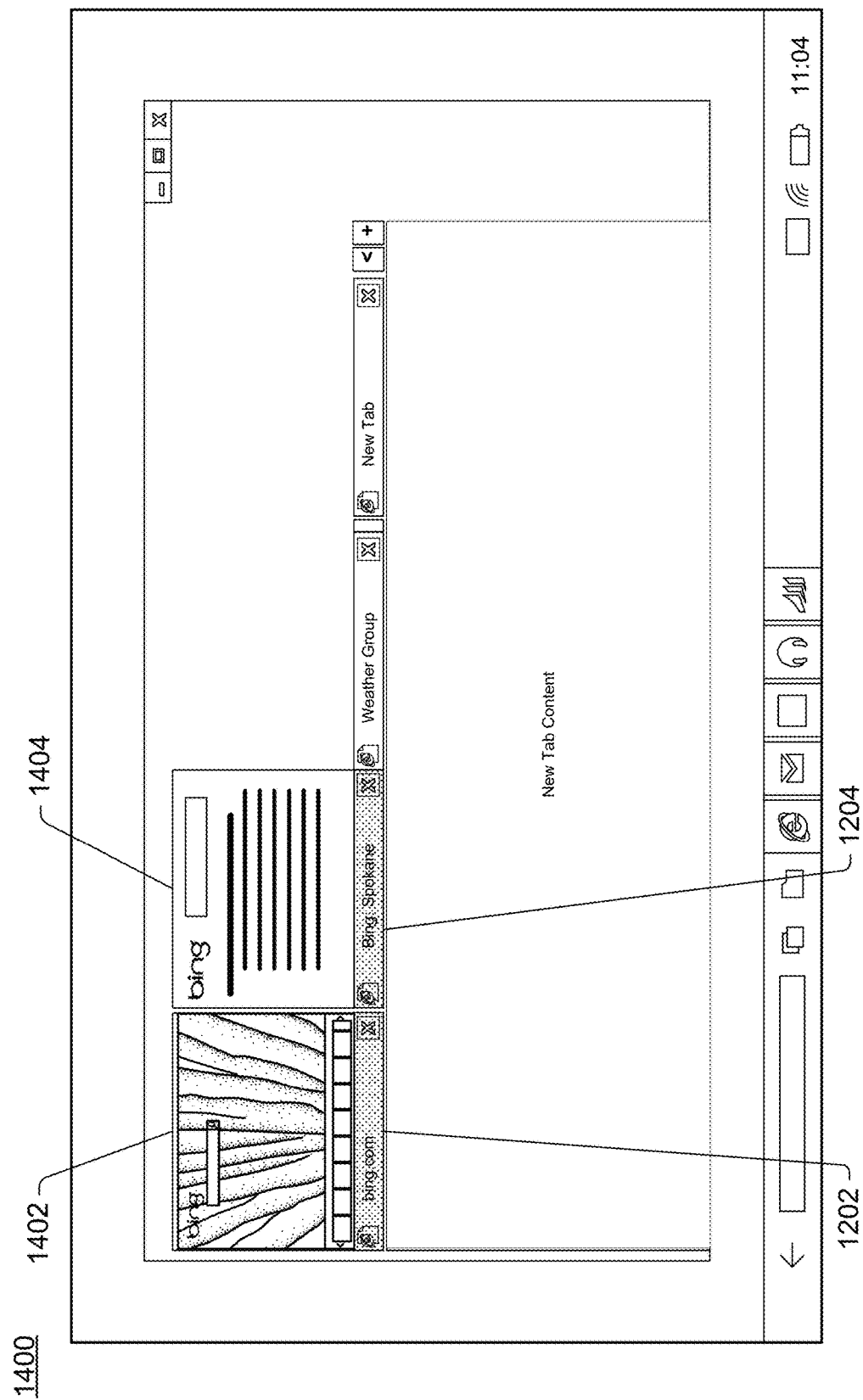
FIG. 14 illustrates an example of displaying a peek view of one or more tabs in a tab row in accordance with one or more embodiments.

FIG. 14 illustrates an example 1400 of displaying a peek view of one or more tabs in a tab row in accordance with one or more embodiments. In example 1400, a tab group (e.g., tab group 802 of FIG. 8) is expanded to display tabs 1202 and 1204 in the tab row with a visual indication to show that tabs 1202 and 1204 belong to tab group 802. In response to receiving an input corresponding to one of tabs 1202 or 1204, peek views 1402 and 1404 of content associated with tabs 1202 and 1204 are displayed in the user interface. The input corresponding to one of tabs 1202 or 1204 may be received in any of the variety of manners described above. For example, the input may be a hover event, a double click, a double tap, or any other manner of input detected at one of tabs 1202 or 1204. Using a mouse input scenario for example, a hover event corresponds to an instance where a mouse pointer "hovers" over a displayed element without necessarily activating the element. Activating the element (as by clicking on the element), on the other hand, may result in a different action.

Although illustrated as displayed above the tab row in the user interface, peek views 1402 and 1404 may be displayed at any location in the user interface. As described herein, a peek view refers to a preview display of content associated with a tab displayed in the tab row. The peek view enables a user to quickly view a display of content associated with the tab without having to navigate through individual tabs. The content displayed in the peek view may be any display of content associated with the tab, such as current content of a web page associated with the tab, a display area that was most recently viewed when the tab was last active, and so forth. Alternatively or additionally, peek views may be displayed for all tabs in the tab row displayed as ungrouped tabs in response to receiving the input corresponding to one of the tabs in the tab row displayed as an ungrouped tab.

Figure 15:
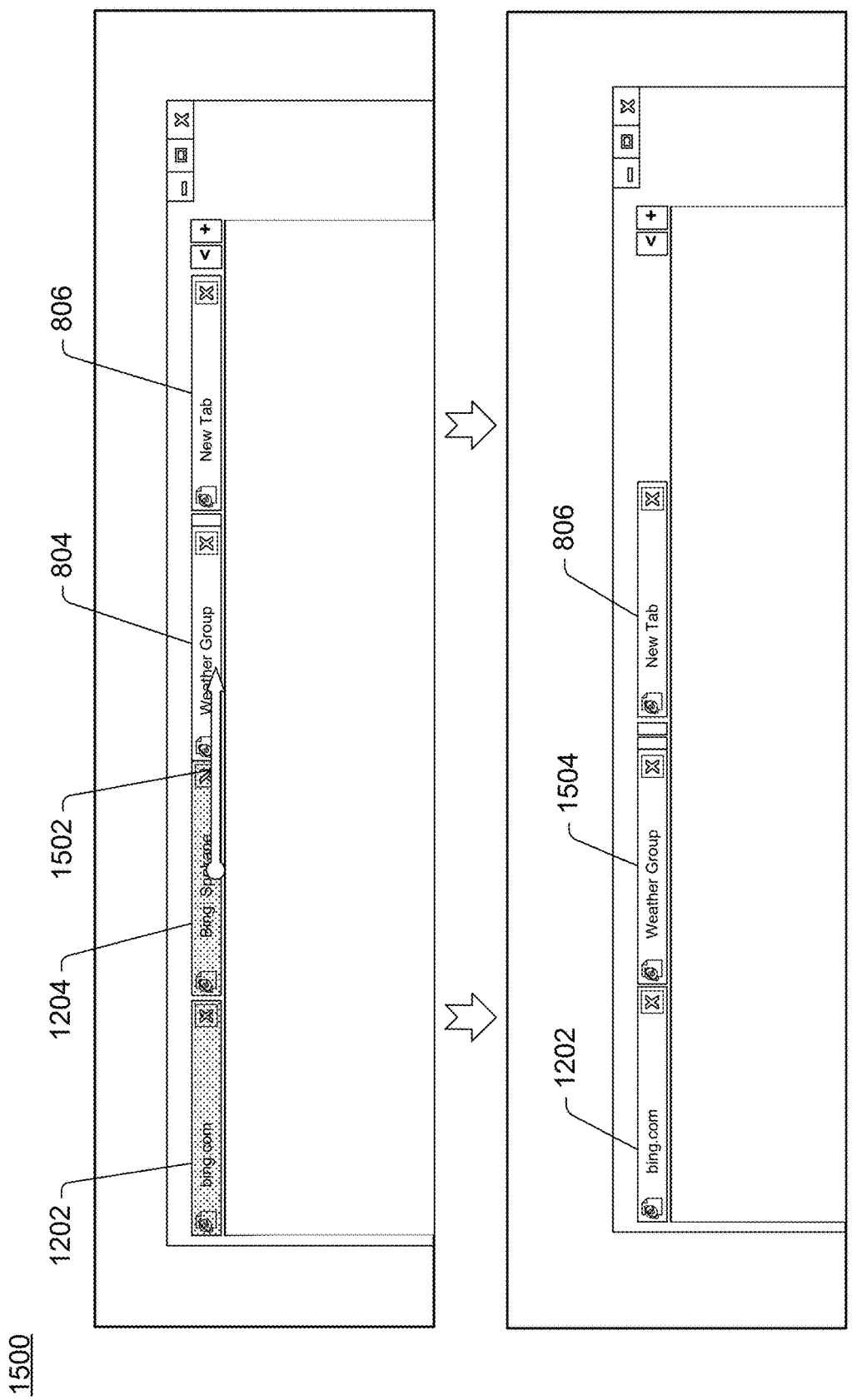
FIG. 15 illustrates an example of adjusting a display position of a tab in a tab row in accordance with one or more embodiments.

FIG. 15 illustrates an example 1500 of adjusting a display position of a tab in a tab row in accordance with one or more embodiments. In example 1500, tabs 1202 and 1204 are displayed in an expanded view to show that tabs 1202 and 1204 belong to tab group 802. Example 1500 also includes tab group 804 and ungrouped tab 806 displayed in the tab row. Input 1502 is received at tab 1204 and drags tab 1204 into group 804 (e.g., using a touchscreen gesture, or a mouse pointer, tab 1204 is dragged and dropped onto tab group 804). Based on input 1502, tab 1204 is removed from group 802 and added to group 804. Because group 802 only includes tab 1202 after input 1502, tab 1202 is displayed as an ungrouped tab in the tab row. Alternatively, if multiple tabs remain in tab group 802 after input 1502 moves tab 1204 into group 804, the multiple tabs remain displayed in the expanded view in the tab line with the visual indication that the multiple tabs belong to tab group 802.

It should be noted that adjusting a display position of a tab in a tab row is not limited to moving a tab from one tab group to another tab group. Input 1502 may drag a tab out of a tab group into the tab row so that the tab is displayed as an ungrouped tab. Alternatively, input 1502 may drag an ungrouped tab in the tab row into a tab group in the tab row. Alternatively, input 1502 may drag an ungrouped tab onto another ungrouped tab and create a new tab group in the tab row. Alternatively, input 1502 may drag a first tab group into a second tab group and create a new tab group comprising the first and second tab groups. Alternatively, input 1502 may adjust a display position of an ungrouped tab or a tab group as displayed in the tab row. For example, dragging tab group 804 to the right of ungrouped tab 806 would adjust the display position such that tab group 804 is displayed to the right of ungrouped tab 806 in the tab row.

In certain circumstances, a user may wish to manage multiple tabs displayed in a tab row without grouping together any of the multiple tabs. For example, a user may wish to sort the displayed tabs such that tabs corresponding to similar content are displayed adjacent to one another, allowing the user to readily navigate between multiple tabs without having to remember where the tab is displayed in the tab row. This is especially useful in situations where the user has such a high number of tabs open simultaneously that the tabs cannot all be displayed in the tab row at once.

FIG. 16 is a flowchart illustrating an example process 1600 for sorting multiple tabs in a tab row in accordance with one or more embodiments. Process 1600 can be implemented in software, firmware, hardware, or combinations thereof. For example, process 1600 may be implemented by sorting module 118 of FIG. 1. Process 1600 is shown as a set of acts and is not limited to the order shown for performing the operations of various acts. Process 1600 is an example process for sorting multiple tabs in a tab row; additional discussions of sorting multiple tabs in a tab row are included herein with reference to different figures.

In process 1600, one or more options for sorting tabs are displayed in a tab row (act 1602).

An input corresponding to a selection of one of the one or more options is received (act 1604).

Tabs are then sorted and displayed in the tab row according to the selected option (act 1606). Displaying the sorted tabs may be performed in any suitable manner including, for example, ordered alphabetically, ordered by a time a tab was most recently accessed, ordered by an amount of time that a tab is the active tab, and so on.

Sorting the tabs according to the selected option in act 1606 reduces the likelihood of data entry errors when interacting with the computing device due to the tabs being sorted in an order desired or expected by the user. Sorting the tabs according to the selected option in act 1606 also increases the efficiency of user interaction with the computing device by arranging the tabs in an order desired or expected by the user.

Figure 17:
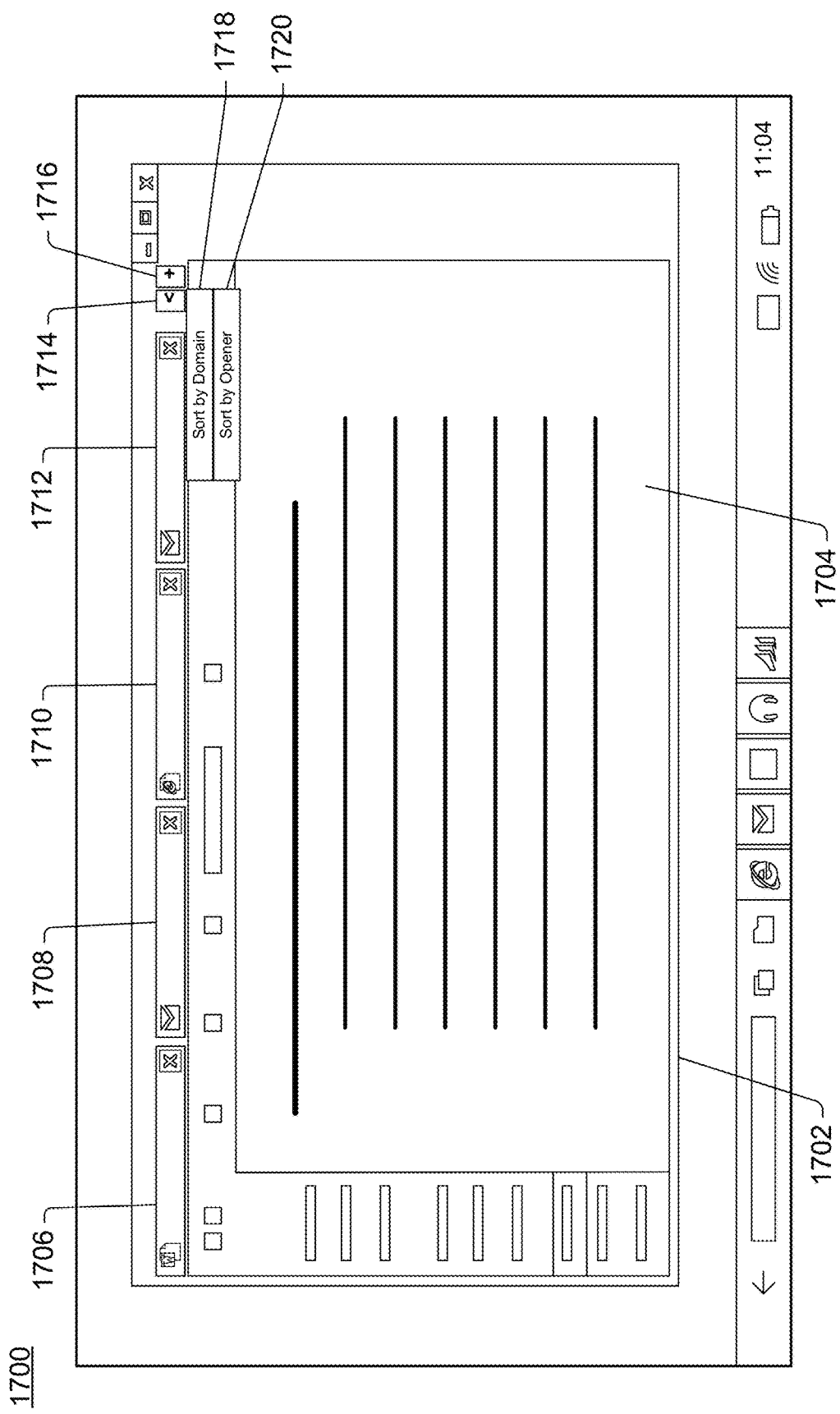
FIG. 17 illustrates an example of displaying options for sorting multiple tabs in the tab row in accordance with one or more embodiments.

FIG. 17 illustrates an example 1700 of displaying options for sorting multiple tabs in the tab row in accordance with one or more embodiments. In example 1700, user interface 1702 includes a display of tab content 1704 disposed proximal to a tab row that includes multiple ungrouped tabs 1706, 1708, 1710, and 1712, tab management control 1714, and new tab control 1716. The tab content 1704 displays content associated with an active tab in the tab row. In the present example, user interface 1702 supports interaction with multiple applications in a tabbed display, where each tab is associated with an application. For example, tab 1706 is associated with a word processing application, tabs 1708 and 1712 are associated with a messaging application, and tab 1710 is associated with a web application.

Multiple tab management options are displayed in response to receiving an input at tab management control 1714, including tab management options 1718 and 1720. Although the present example illustrates displaying the multiple tab management options in response to receiving a user input at tab management control 1706, the multiple tab management options may also be displayed responsive to receiving a user input at an ungrouped tab displayed in the tab row.

Tab management option 1718 sorts ungrouped tabs in the tab row by a domain associated with each of the ungrouped tabs in the tab row, as described above. Tab management option 1720 sorts ungrouped tabs in the tab row by an opener associated with each of the ungrouped tabs in the tab row, as described above.

Figure 18:
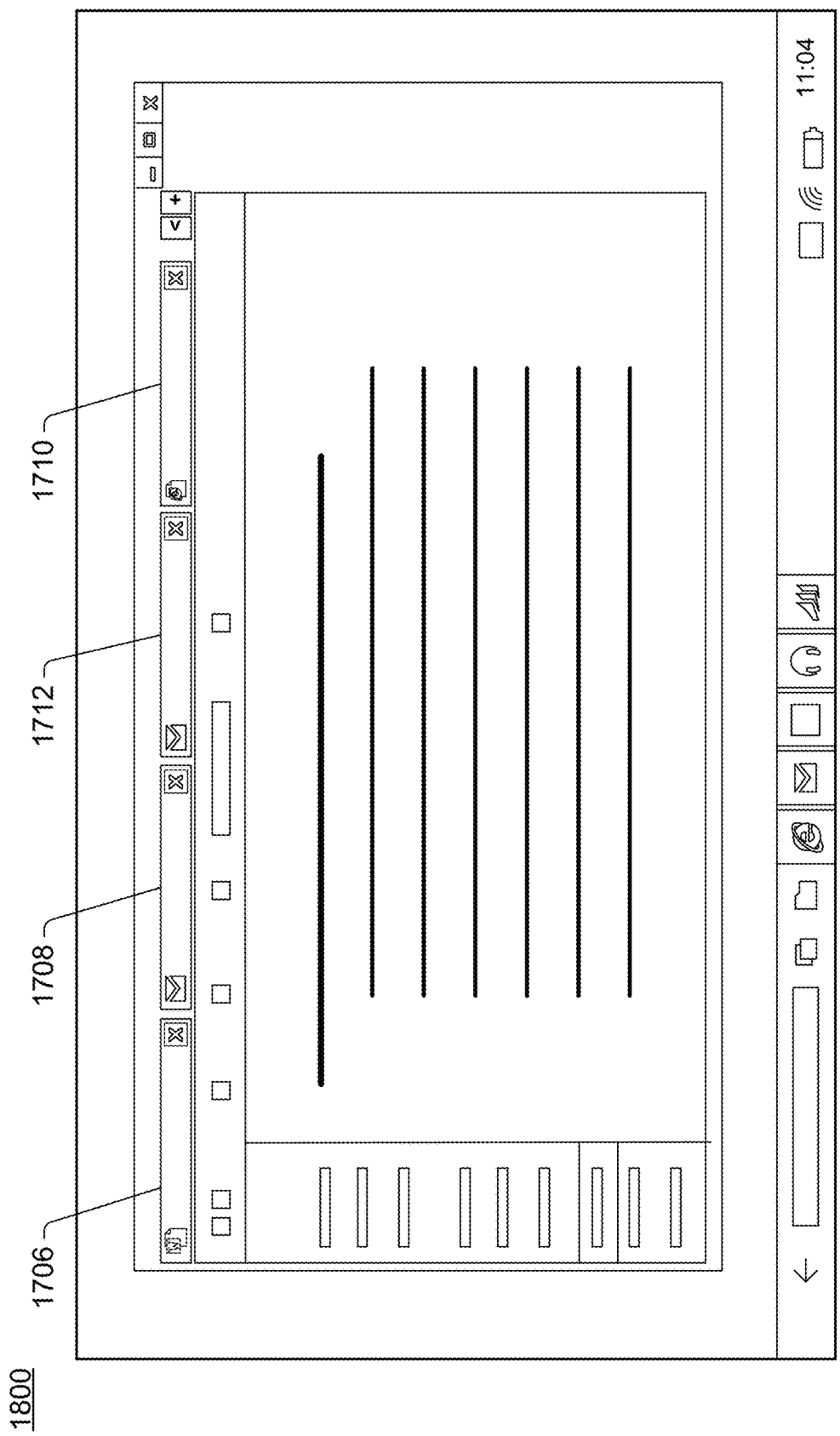
FIG. 18 illustrates an example of multiple tabs sorted in the tab row in accordance with one or more embodiments.

FIG. 18 illustrates an example 1800 of multiple tabs sorted in the tab row in accordance with one or more embodiments. This example illustrates tabs 1706, 1708, 1710, and 1712 sorted and displayed in response to selection of tab management option 1718, "Sort by Domain". As described above, tab 1706 is associated with a word processing application, tabs 1708 and 1712 are associated with a messaging application, and tab 1710 is associated with a web application. As shown in FIG. 18, selecting option 1718 sorts and displays tabs in the tab row so that tabs are displayed adjacent to other tabs in the tab row corresponding to the same domain. In this example, a display position of tabs 1712 and 1710 are adjusted so that tabs 1708 and 1712 are displayed adjacent to each other, as tabs 1708 and 1712 correspond to the same domain.

It should be noted that although two sort options 1718 and 1720 are illustrated in FIG. 17, the sort options described are disclosed as examples and are not exhaustive or intended to limit the techniques described herein. Additional sort options may be displayed, and/or one or more sort options displayed in FIG. 17 may not be displayed.

It should also be noted that one of the sort options discussed above can be combined with one of the sweep options discussed above, and the combination being the default functionality of the tab management control 206 of FIG. 2. For example, the default functionality of the tab management control 206 may be to group all ungrouped tabs located to the left of an active tab in the tab row into a tab group ("Sweep All Left") and sort any ungrouped tabs by domain ("Sort by Domain").

In the discussions herein, various different embodiments are described. It is to be appreciated and understood that each embodiment described herein can be used on its own or in connection with one or more other embodiments described herein. For example, a tab management system may implement any one or combination of the process 300 of FIG. 3, the process 500 of FIG. 5, the process 900 of FIG. 9, the process 1100 of FIG. 11, the process 1300 of FIG. 13, and the process 1600 of FIG. 16.

Figure 19:
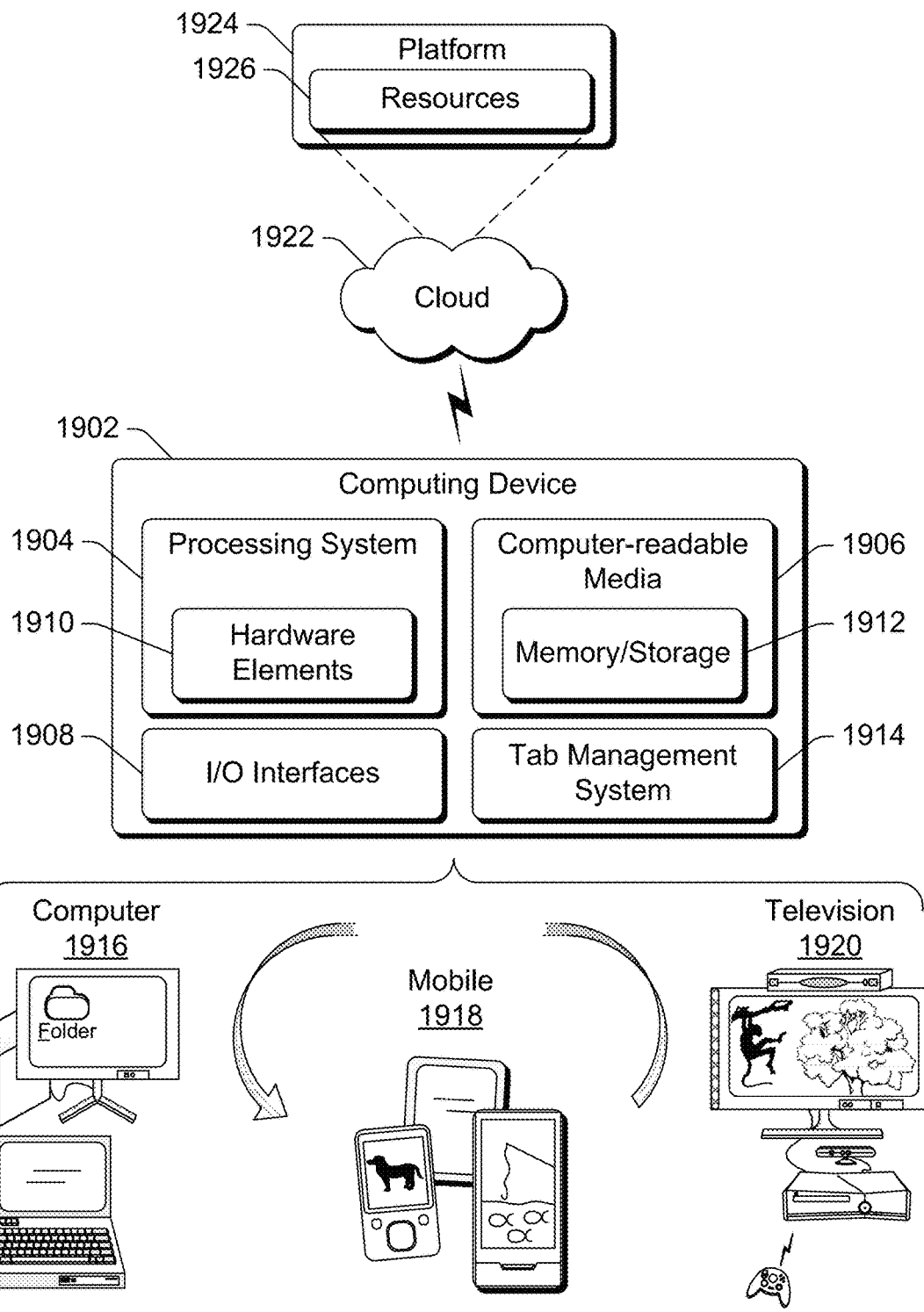
FIG. 19 illustrates an example system that includes an example computing device that is representative of one or more systems and/or devices that may implement the various techniques described herein.

FIG. 19 illustrates an example system generally at 1900 that includes an example computing device 1902 that is representative of one or more systems and/or devices that may implement the various techniques described herein. The computing device 1902 may be, for example, a server of a service provider, a device associated with a client (e.g., a client device), an on-chip system, and/or any other suitable computing device or computing system.

The example computing device 1902 as illustrated includes a processing system 1904, one or more computer-readable media 1906, and one or more I/O Interfaces 1908 that are communicatively coupled, one to another. Although not shown, the computing device 1902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1904 is representative of functionality to perform one or more operations using hardware. Accordingly, the processing system 1904 is illustrated as including hardware elements 1910 that may be configured as processors, functional blocks, and so forth. This may include implementation in hardware as an application specific integrated circuit or other logic device formed using one or more semiconductors. The hardware elements 1910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1906 is illustrated as including memory/storage 1912. The memory/storage 1912 represents memory/storage capacity associated with one or more computer-readable media. The memory/storage 1912 may include volatile media (such as random access memory (RAM)) and/or nonvolatile media (such as read only memory (ROM), Flash memory, optical disks, magnetic disks, and so forth). The memory/storage 1912 may include fixed media (e.g., RAM, ROM, a fixed hard drive, and so on) as well as removable media (e.g., Flash memory, a removable hard drive, an optical disc, and so forth). The computer-readable media 1906 may be configured in a variety of other ways as further described below.

The one or more input/output interface(s) 1908 are representative of functionality to allow a user to enter commands and information to computing device 1902, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1902 may be configured in a variety of ways as further described below to support user interaction.

The computing device 1902 also includes a tab management system 1914. The tab management system 1914 provides various tab management functionality, including grouping and sorting functionality, as discussed above. The tab management system 1914 can implement, for example, the operating environment 100 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1902. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1910 and computer-readable media 1906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1910. The computing device 1902 may be configured to implement particular instructions and/or functions corresponding to the software and/or hardware modules. Accordingly, implementation of modules as a module that is executable by the computing device 1902 as software may be achieved at least partially in hardware, e.g., through use of computer-readable storage media and/or hardware elements 1910 of the processing system. The instructions and/or functions may be executable/operable by one or more articles of manufacture (for example, one or more computing devices 1902 and/or processing systems 1904) to implement techniques, modules, and examples described herein.

As further illustrated in FIG. 19, the example system 1900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1900, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1902 may assume a variety of different configurations, such as for computer 1916, mobile 1918, and television 1920 uses. Each of these configurations includes devices that may have generally different constructs and capabilities, and thus the computing device 1902 may be configured according to one or more of the different device classes. For instance, the computing device 1902 may be implemented as the computer 1916 class of a device that includes a personal computer, desktop computer, a multi-screen computer, laptop computer, netbook, and so on.

The computing device 1902 may also be implemented as the mobile 1918 class of device that includes mobile devices, such as a mobile phone, portable music player, portable gaming device, a tablet computer, a multi-screen computer, and so on. The computing device 1902 may also be implemented as the television 1920 class of device that includes devices having or connected to generally larger screens in casual viewing environments. These devices include televisions, set-top boxes, gaming consoles, and so on.

The techniques described herein may be supported by these various configurations of the computing device 1902 and are not limited to the specific examples of the techniques described herein. This functionality may also be implemented all or in part through use of a distributed system, such as over a "cloud" 1922 via a platform 1924 as described below.

The cloud 1922 includes and/or is representative of a platform 1924 for resources 1926. The platform 1924 abstracts underlying functionality of hardware (e.g., servers) and software resources of the cloud 1922. The resources 1926 may include applications and/or data that can be utilized while computer processing is executed on servers that are remote from the computing device 1902. Resources 1926 can also include services provided over the Internet and/or through a subscriber network, such as a cellular or Wi-Fi network.

The platform 1924 may abstract resources and functions to connect the computing device 1902 with other computing devices. The platform 1924 may also serve to abstract scaling of resources to provide a corresponding level of scale to encountered demand for the resources 1926 that are implemented via the platform 1924. Accordingly, in an interconnected device embodiment, implementation of functionality described herein may be distributed throughout the system 1900. For example, the functionality may be implemented in part on the computing device 1902 as well as via the platform 1924 that abstracts the functionality of the cloud 1922.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

Further aspects of the techniques discussed herein relate to one or more of the following embodiments.

A method of controlling a user interface, the method comprising: displaying multiple tabs in a tab row; receiving a single action user input; grouping the multiple tabs of the tab row into a tab group that represents the multiple tabs responsive to receiving the single action user input; and displaying the tab group instead of the multiple tabs in the tab row.

Alternatively or in addition to the above described method, any one or combination of: the method further comprising displaying a tab management control in the tab row, the receiving the single action user input comprising receiving a user selection of the tab management control; the grouping the multiple tabs of the tab row into the tab group comprising grouping all ungrouped tabs of the tab row into the tab group; the grouping the multiple tabs of the tab row into the tab group comprising grouping all tabs displayed to the left of an active tab in the tab row into the tab group or grouping all tabs displayed to the right of an active tab in the tab row into the tab group; the grouping all tabs displayed to the left of the active tab in the tab row into the tab group or grouping all tabs displayed to the right of the active tab in the tab row into the tab group including grouping the active tab into the tab group; the grouping comprising grouping the multiple tabs of the tab row into one or more tab groups, each of the multiple tabs of the tab row being grouped into one of the one or more tab groups based on a domain associated with the tab; the grouping comprising grouping the multiple tabs of the tab row into one or more tab groups, each of the multiple tabs of the tab row being grouped into one of the one or more tab groups based on an opener associated with the tab; the method further comprising displaying a new tab in the tab row in response to all ungrouped tabs of the tab row being grouped into one or more tab groups; the method further comprising sorting the multiple tabs of the tab row in response to receiving an additional user input, and displaying the sorted multiple tabs in the tab row.

A device comprising: one or more processors; and a memory storing executable instructions that are executable by the one or more processors to control a user interface of the computing device by performing operations including: displaying one or more tab groups in a tab row; displaying one or more tabs in the tab row; receiving a user input corresponding to one of the one or more tab groups; receiving a selection of one or more selectable tab group options; and performing the selected one of the selectable tab group options.

Alternatively or in addition to the above described device, any one or combination of: the one or more selectable tab group options comprising one or more of an option to favorite all tabs in a tab group, an option to share all tabs in a tab group, an option to close all tabs in a tab group, or an option to rename a tab group; the operations further comprising expanding a tab group in the tab row, the expanding comprising displaying one or more tabs of the tab group in the tab row as ungrouped tabs; the displaying the one or more tabs of the tab group in the tab row as ungrouped tabs further comprising displaying a visual indication that the one or more tabs of the tab group belong to a common tab group; wherein the expanding comprises collapsing a tab group in response to the tab group being displayed as expanded in the tab row; the operations further comprising receiving an input at one of the one or more tabs displayed in the tab row and displaying, in response to receiving the input at the one of the one or more tabs, a preview of content associated with the tab; wherein displaying the preview of content associated with the tab further comprises displaying a preview of content associated with each ungrouped tab displayed in the tab row.

A method of controlling a user interface, the method comprising: displaying multiple tabs in a tab row; receiving a single action user input; sorting the multiple tabs in the tab row in response to receiving the single action user input; and displaying the sorted multiple tabs in the tab row.

Alternatively or in addition to any of the above described methods, any one or combination of: the sorting comprising sorting the multiple tabs from left to right based on a domain associated with each of the multiple tabs; the sorting comprising sorting the multiple tabs from left to right based on an opener associated with each of the multiple tabs; the method further comprising displaying a list of selectable tab sorting options, the single action user input being received in response to displaying the list of selectable tab sorting options.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a user interface, the method comprising:
   displaying multiple tabs in a tab row;
   displaying, in the tab row, a new tab control separate from the multiple tabs;
   displaying, in the tab row, a tab management control separate from both the multiple tabs and the new tab control;
   receiving a single action user input at the tab management control, the single action user input comprising a selection of the tab management control;
   grouping, responsive to the single action user input, a first set of the multiple tabs of the tab row into a first tab group that is grouped based on a domain;
   grouping, responsive to the single action user input, a second set of the multiple tabs of the tab row into a miscellaneous tab group, wherein each tab in the miscellaneous tab group corresponds to a website that is not of the domain; and
   displaying the first tab group and the miscellaneous tab group instead of the multiple tabs in the tab row.

2. The method as recited in claim 1, further comprising displaying a new tab in the tab row in response to all ungrouped tabs of the tab row being grouped into one or more tab groups.

3. The method as recited in claim 1, further comprising:
   sorting the multiple tabs of the tab row in response to receiving an additional user input; and
   displaying the sorted multiple tabs in the tab row.

4. The method of claim 1, further comprising:
   receiving a single selection of user interface element for favoriting each tab in the first tab group; and
   causing each tab in the first tab group to be favorited.

5. The method of claim 1, further comprising:
   receiving a single selection of a user interface element for sharing each tab in the first tab group; and
   copying a link corresponding to each tab in the first tab group to a messaging service.

6. The method of claim 1, further comprising:
   receiving a single selection of a user interface element for sharing each tab in the first tab group; and
   coping a link corresponding to each tab in the first tab group to a document.

7. The method of claim 1, further comprising:
   receiving a single selection of a user interface element for sharing each tab in the first tab group; and
   posting a link corresponding to each tab in the first tab group to a social networking service.

8. A device comprising:
   one or more processors; and
   a memory storing executable instructions that are executable by the one or more processors to control a user interface of the computing device by performing operations including:
      displaying one or more tab groups in a tab row;
      displaying one or more tabs, separate from the one or more tab groups, in the tab row;
      receiving a user input corresponding to one of the one or more tab groups; and
      responsive to receiving the user input:
         expanding the one of the one or more tab groups by displaying tabs of the one of the one or more tab groups in the tab row as ungrouped tabs; and
         automatically causing one of the ungrouped tabs to be displayed as an active tab based on a most recent accessed tab.

9. The device as recited in claim 8, the operations further comprising displaying one or more selectable tab group options for the one of the one or more tab groups, the one or more selectable tab group options further comprising an option to rename a tab group.

10. The device as recited in claim 8, the displaying the one or more tabs of the tab group in the tab row as ungrouped tabs further comprising displaying a visual indication that the one or more tabs of the tab group belong to a common tab group.

11. The device as recited in claim 8, wherein the expanding comprises collapsing a tab group in response to the tab group being displayed as expanded in the tab row.

12. The device as recited in claim 8, the operations further comprising receiving an input at one of the one or more tabs displayed in the tab row and displaying, in response to receiving the input at the one of the one or more tabs, a preview of content associated with the tab.

13. The device as recited in claim 12, wherein displaying the preview of content associated with the tab further comprises displaying a preview of content associated with each ungrouped tab displayed in the tab row.

14. The device as recited in claim 8, wherein displaying the active tab comprises displaying tab content of the active tab in a user interface without displaying tab content of others of the ungrouped tabs.

15. The device as recited in claim 8, the operations further comprising displaying a preview of content associated with each ungrouped tab displayed in the tab row.

16. A method of controlling a user interface, the method comprising:
   displaying multiple tabs in a tab row;
   displaying, in the tab row, a new tab control separate from the multiple tabs;
   displaying, in the tab row, a tab management control separate from both the multiple tabs and the new tab control;
   receiving a single action user input at the tab management control, the single action user input comprising a selection of the tab management control;
   sorting a first set of the multiple tabs in the tab row in response to receiving the single action user input at the tab management control into a first tab group that is based on a domain;
   sorting a second set of the multiple tabs in the tab row in response to receiving the single action user input at the tab management control into a miscellaneous tab group, wherein each tab in the miscellaneous tab group corresponds to a website that is not of the domain; and
   displaying the sorted first and second sets of the multiple tabs instead of the multiple tabs in the tab row.

17. The method of claim 16, further comprising receiving an input at one of the multiple tabs displayed in the tab row and displaying, in response to receiving the input at the one of the multiple tabs, a preview of content associated with the tab.

18. The method of claim 16, further comprising:
   receiving a single selection of user interface element for favoriting each tab in the first tab group; and
   causing each tab in the first tab group to be favorited.

19. The method of claim 16, further comprising:
   receiving a single selection of a user interface element for sharing each tab in the first tab group; and copying a link corresponding to each tab in the first tab group to a messaging service.

20. The method of claim 16, further comprising:

receiving a single selection of a user interface element for sharing each tab in the first tab group; and posting a link corresponding to each tab in the first tab group to a social networking service.

\* \* \* \* \*